(12) United States Patent
Ouyang et al.

(10) Patent No.: US 10,343,103 B2
(45) Date of Patent: Jul. 9, 2019

(54) FILTRATION MEDIA, PLEATED MEDIA PACK, FILTER CARTRIDGE, AND METHODS FOR MANUFACTURING

(71) Applicant: Donaldson Company, Inc., Minneapolis, MN (US)

(72) Inventors: Ming Ouyang, Woodbury, MN (US); Daniel T. Risch, Burnsville, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 167 days.

(21) Appl. No.: 15/500,897

(22) PCT Filed: Jul. 31, 2015

(86) PCT No.: PCT/US2015/043231
§ 371 (c)(1),
(2) Date: Jan. 31, 2017

(87) PCT Pub. No.: WO2016/019307
PCT Pub. Date: Feb. 4, 2016

(65) Prior Publication Data
US 2017/0216757 A1  Aug. 3, 2017

Related U.S. Application Data

(60) Provisional application No. 62/187,484, filed on Jul. 1, 2015, provisional application No. 62/032,395, filed on Aug. 1, 2014.

(51) Int. Cl.
*B01D 46/52* (2006.01)
*B01D 46/00* (2006.01)

(52) U.S. Cl.
CPC ....... *B01D 46/523* (2013.01); *B01D 46/0001* (2013.01); *B01D 46/522* (2013.01);
(Continued)

(58) Field of Classification Search
CPC .. B01D 46/522; B01D 46/523; B01D 46/525; B01D 46/526; B01D 46/527; B01D 46/0001
See application file for complete search history.

(56) References Cited

U.S. PATENT DOCUMENTS

| 1,639,133 A | 8/1927 | Greene |
| 2,135,863 A | 11/1938 | Walker et al. |

(Continued)

FOREIGN PATENT DOCUMENTS

| DE | 3802190 | 8/1989 |
| JP | 61200116 | 12/1986 |

(Continued)

OTHER PUBLICATIONS

"International Preliminary Report on Patentability," for PCT/US2015/043231, dated Feb. 16, 2017 (9 pages).

(Continued)

*Primary Examiner* — Robert Clemente
(74) *Attorney, Agent, or Firm* — Pauly, DeVries Smith & Deffner LLC

(57) ABSTRACT

Filter media includes a filtration substrate having a first side and a second side, and constructed for filtering a fluid by flow of the fluid therethrough. The filtration substrate has a a machine direction extending from a first end to a second end, and a cross direction extending from a first edge to a second edge. The filtration substrate includes a plurality of corrugations extending in the machine direction. The plurality of corrugations include a plurality of first crests formed along the first side and a plurality of second crests formed along the second side. The filtration substrate includes a plurality of bosses along the plurality of first crests or along the plurality of second crests and extending in a direction away from the other of the plurality of first (Continued)

crests or the plurality of second crests. Media packs, filter elements, and methods of making are provided.

19 Claims, 18 Drawing Sheets

(52) U.S. Cl.
CPC ......... B01D 46/525 (2013.01); B01D 46/526 (2013.01); B01D 46/527 (2013.01)

(56) References Cited

U.S. PATENT DOCUMENTS

| | | |
|---|---|---|
| 2,784,802 A | 3/1957 | Bub et al. |
| 2,836,302 A | 5/1958 | Buckman |
| 2,874,849 A | 2/1959 | Browne et al. |
| 2,908,350 A | 10/1959 | Buckman |
| 2,936,855 A | 5/1960 | Allen et al. |
| 2,945,559 A | 7/1960 | Buckman |
| 2,968,361 A | 1/1961 | Buckman |
| 4,268,290 A | 5/1981 | Barrington |
| 4,842,739 A | 6/1989 | Tang et al. |
| 5,290,447 A | 3/1994 | Lippold |
| 5,306,321 A | 4/1994 | Osendorf |
| 5,346,519 A | 9/1994 | Williams |
| 5,609,761 A | 3/1997 | Franz |
| 5,823,201 A | 10/1998 | Matsumura |
| 5,888,262 A | 3/1999 | Kahler |
| 5,919,122 A | 7/1999 | Geiger et al. |
| 5,938,920 A | 8/1999 | Kearney et al. |
| 6,059,861 A | 5/2000 | Davila et al. |
| 6,673,136 B2 | 1/2004 | Gillingham et al. |
| 6,685,833 B2 | 2/2004 | Lippold |
| 6,824,581 B1 | 11/2004 | Tate et al. |
| 6,955,775 B2 | 10/2005 | Chung et al. |
| 7,270,693 B2 | 9/2007 | Chung et al. |
| 7,323,105 B1 | 1/2008 | Janikowski et al. |
| 7,425,227 B1 | 9/2008 | Hutchison et al. |
| 7,625,418 B1 | 12/2009 | Choi |
| 2006/0151382 A1 | 7/2006 | Petrik |
| 2006/0272305 A1 | 12/2006 | Morgan |
| 2010/0078379 A1 | 4/2010 | Rocklitz |
| 2012/0223008 A1 | 9/2012 | Mbadinga-Mouanda et al. |

FOREIGN PATENT DOCUMENTS

| | | |
|---|---|---|
| WO | 0006287 | 2/2000 |
| WO | 2004039476 | 5/2004 |
| WO | 2010011910 | 1/2010 |
| WO | 2016019307 | 2/2016 |

OTHER PUBLICATIONS

"International Search Report & Written Opinion," for PCT/US2015/043231, dated Dec. 7, 2015 (12 pages).

FILTRATION MEDIA, PLEATED MEDIA PACK, FILTER CARTRIDGE, AND METHODS FOR MANUFACTURING

This application is a national stage application under 35 U.S.C 371 of PCT International Patent Application No. PCT/US2015/043231, filed Jul. 31, 2015, claims priority to U.S. Provisional Application No. 62/032,395, filed Aug. 1, 2014, and U.S. Provisional Application No. 62/187,484, filed Jul. 1, 2015, the entire disclosures of which are incorporated by reference in their entirety.

TECHNICAL FIELD

The present disclosure relates to filtration media, pleated media packs, filter cartridges, and methods for manufacturing filtration media, pleated media pack, and filter cartridges. The present disclosure is directed to corrugated filtration media having a first side and a second side, a plurality of first crests formed along the first side and a plurality of second crests formed along the second side, and a plurality of bosses located along at least one of the plurality of first crests or the plurality of second crests.

BACKGROUND

Fluid streams, such as air and liquid, carry contaminant material therein. In many instances, it is desired to filter some or all of the contaminant material from the fluid stream. For example, air flow streams to engines for motorized vehicles or for power generation equipment, gas streams to gas turbine systems, air streams to various combustion furnaces, and air streams to an enclosed environment carry particulate contaminant therein that should be filtered. Also liquid streams in the engine lubrication systems, hydraulic systems, coolant systems, and fuel systems, can carry particulate contaminant that should be filtered. It is preferred for such systems that the fluid streams are free from select contaminant material or have the level of contaminant material therein reduced. A variety of fluid filter (air or liquid filter) arrangements have been developed for contaminant reduction.

In the case of pleated filtration media, the pleat density refers to the number of pleats that can be arranged in a given distance. For a given filtration application, there is often a desired pleat density that maximizes surface area of the filtration media available for filtration and, at the same time, does not contribute to undesired pressure drop across the pleated filtration media as a result of the pleats being too tightly arranged. In addition, it is desirable that the filtration media does not "bunch" or touch because filtration media on adjacent pleat faces that touch becomes "masked media" and masked media is generally not available for filtration. Accordingly, the existence of masking results in loss of filtration surface area. An exemplary prior approach to reduce masking is to use "spacers" for separating the pleat faces. An exemplary disclosure of "spacers" is provided in U.S. Pat. No. 7,625,418.

Pleated media packs formed from corrugated filtration media are disclosed. For example, see U.S. Pat. Publ. No. US 2006/0151382 and U.S. Pat. Publ. No. US 2010/0078379.

SUMMARY

Filter media is described that includes a filtration substrate having a first side and a second side, and constructed for filtering a fluid by flow of the fluid therethrough from the first side to the second side or from the second side to the first side. The filtration substrate has a first edge and a second edge, and a first end and a second end, wherein the filtration substrate has a machine direction extending from the first end to the second end, and a cross direction extending from the first side to the second side. The filtration substrate includes a plurality of corrugations located in the cross direction and extending in the machine direction. The plurality of corrugations include a plurality of first crests formed along the first side of the filtration substrate and a plurality of second crests formed along the second side of the filtration substrate. The filtration substrate includes a plurality of bosses located along the plurality of first crests or along the plurality of second crests and extending in a direction away from the other of the plurality of first crests or the plurality of second crests.

A filter media pack is described that includes filter media provided in a pleated configuration including alternating first and second pleat tips and alternating first and second pleat faces. The filter media includes a first edge and a second edge, and a width extending from the first edge to the second edge. The filter media includes a first end and a second end, and a length extending from the first end to the second end. The alternating first and the second pleat tips and the alternating first and second pleat faces are located along the length of the filter media. The filter media includes a plurality of corrugations arranged across the width of the media pack and extending along the length of the filter media. The plurality of corrugations include alternating first arcs and second arcs wherein the first arcs and the second arcs are in opposite directions and each of the first arcs include a first crest and each of the second arcs include a second crest. The filter media includes a plurality of bosses located along the first crest of the first arcs or along the second crest of the second arcs so that the bosses extend in direction away from the other of the first crest or the second crest.

Filter elements and methods of making filter media, media packs, and filter elements are described.

DETAILED DESCRIPTION

Figure 1:
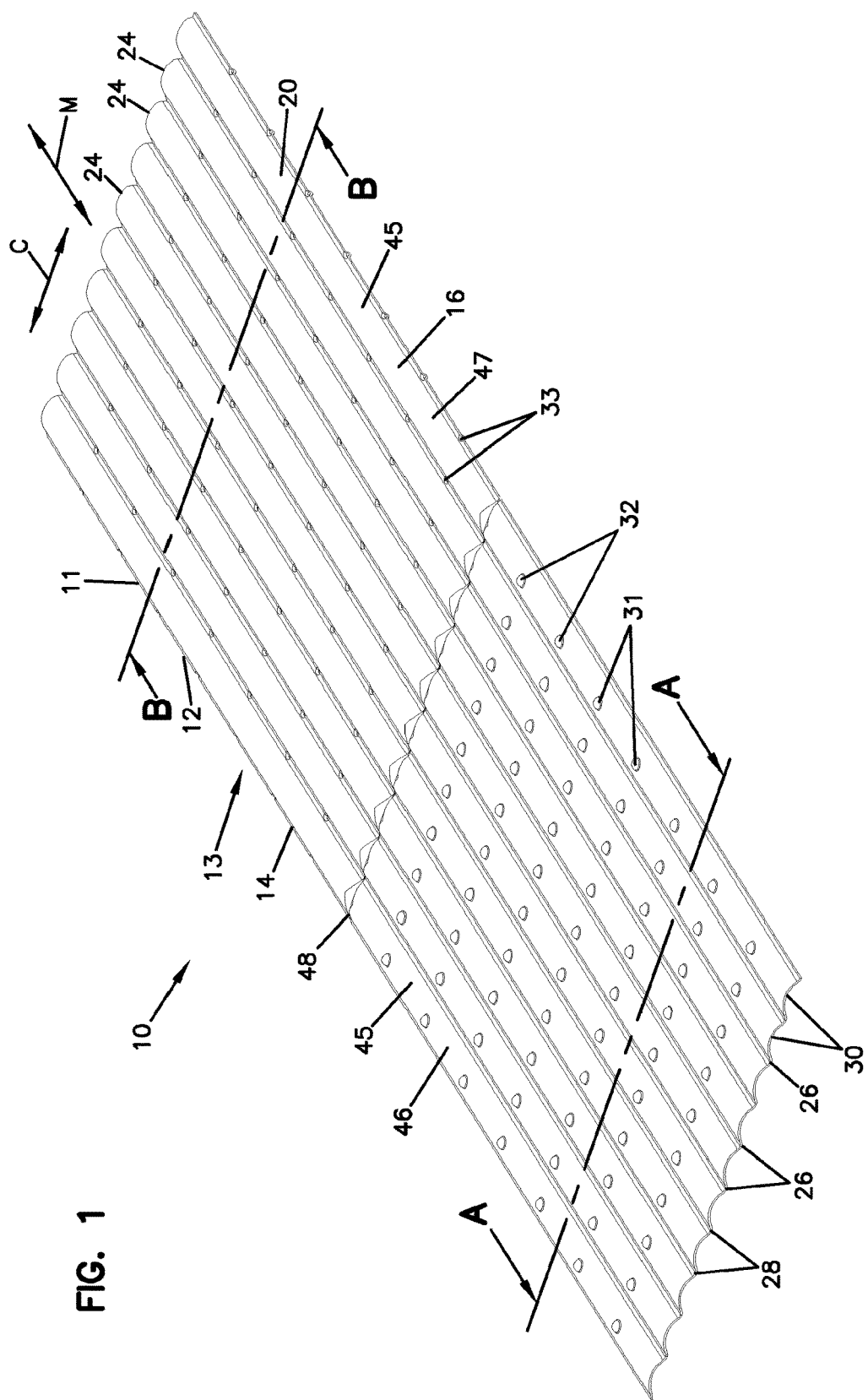
FIG. 1 is a perspective view of a portion of a filtration media substrate in a corrugated configuration and including a plurality of bosses according to the principles of the present disclosure.
Figure 2:
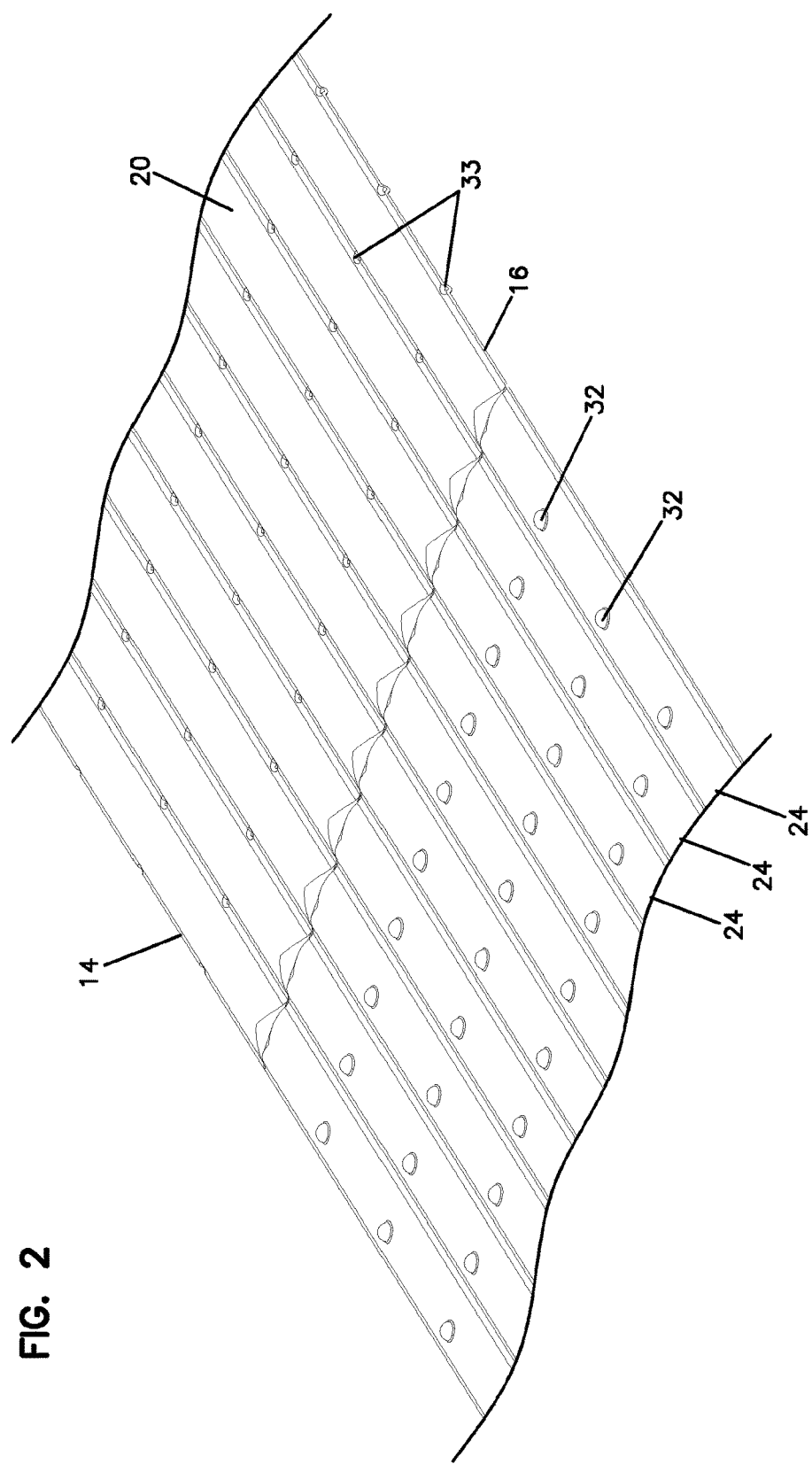
FIG. 2 is a perspective view of a portion of the filtration media substrate of FIG. 1.
Figure 3:
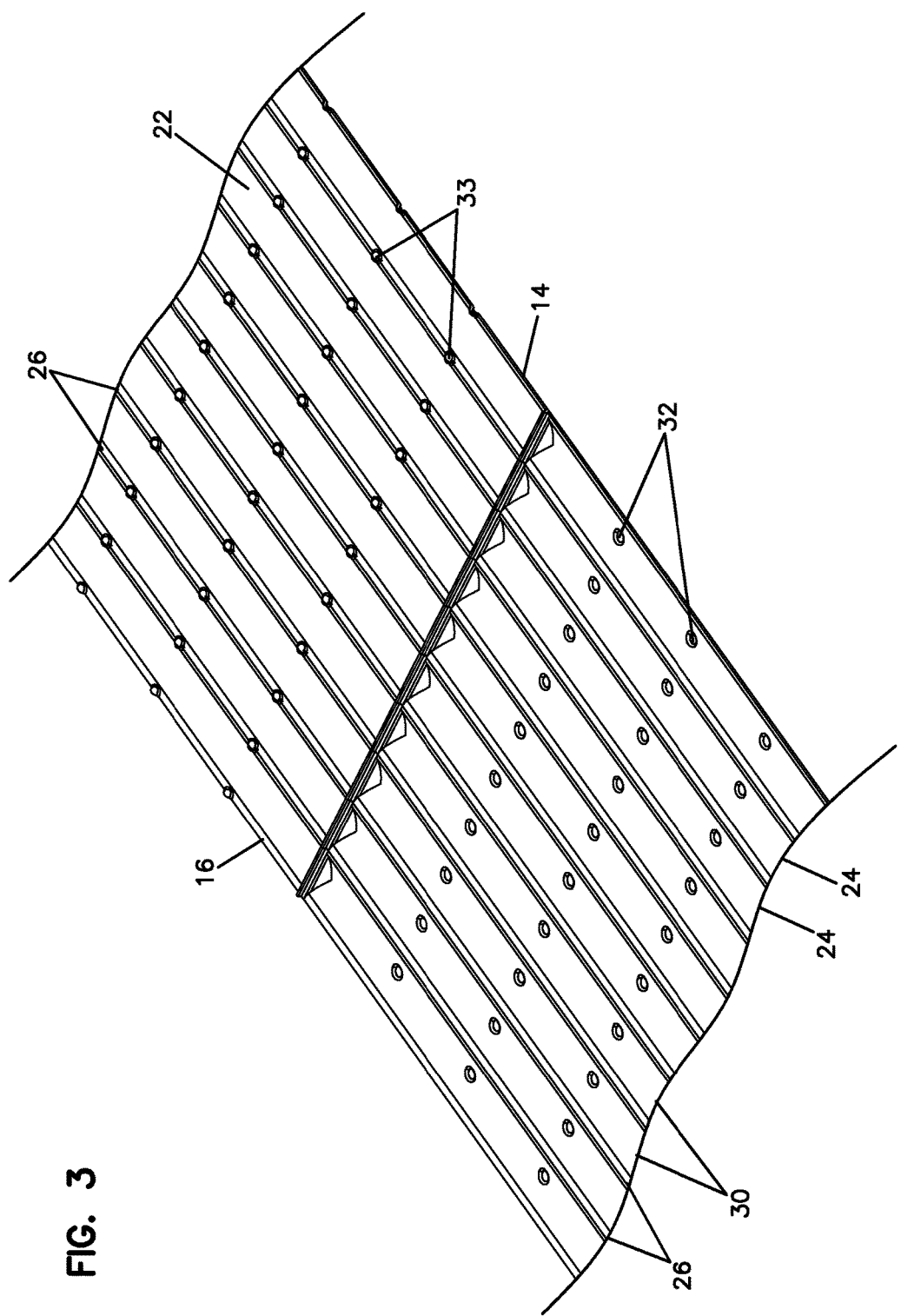
FIG. 3 is a perspective view of a portion of the filtration media substrate of FIG. 1.

The disclosure relates to filtration media, pleated filtration media packs, filter cartridges, and methods for manufacturing filtration media, pleated filtration media packs, and filter cartridges. The pleated filtration media packs can be formed by pleating the filtration media. In general, filtration media can be referred to more simply as "filter media" or "media" and refers to a substrate that is used for filtering particulate contaminants from a fluid stream. The fluid stream can be a gas stream or a liquid stream. An exemplary gas stream includes air, and the air stream can be provided for air intake for engines for motor vehicles, power generation equipment, various combustion furnaces, HVAC, and for enclosed environments where particulates should be removed, such as work and home environments and clean rooms. The gas stream can also be a gas stream such as a gas stream to a gas turbine system. Exemplary liquid streams include engine lubrication systems, hydraulic systems, coolant systems, fuel systems, and water.

The filtration media can be folded back and forth to form pleats, and the result can be referred to as a pleated media pack. The folds in a pleated media pack are often referred to as pleat tips (or pleat folds), and the pleat tips on opposite sides of the media pack typically form the inlet flow face and the outlet flow face. The expanses of the filter media extending between pleat tips are often referred to as pleat faces. Pleated media packs are sometime referred to as zigzag media packs because the filter media is arranged in a zigzag pattern where the filter media alternates from pleat tip to pleat face to pleat tip to pleat face, etcetera.

Pleated media packs can be arranged in any desired configuration. Exemplary configurations include panel filter arrangements and closed loop or tubular filter arrangements. Panel filter configurations include panel filters and often have an inlet flow face and an outlet flow face arranged on opposite sides of the filter cartridge so that the fluid to be filtered enters the media pack at the inlet flow face and filtered fluid exits the media pack at the outlet flow face on the opposite side of the media pack. Panel filters are common in situations where the fluid flows in a straight through configuration. Closed loop or tubular filter arrangements often have an inlet flow face on an outside of the media pack and an outlet flow face on an inside of the media pack, or vice versa. Exemplary closed loop filter arrangements include cylindrical and conical filters. Cylindrical filters and conical filters often have an outside flow face and an inside flow face where fluid typically flows from an outside surface and through the filtration media to an internal region and then out one or both of the end caps, or vice versa.

Filtration Media

Now referring to FIGS. 1-4, an exemplary filtration media or filter media is shown at reference number 10. The filter media 10 is shown as a discrete sheet but it should be understood that the filter media 10 can be considered extending almost continuously in the machine direction indicated by the arrow M. The transverse to the machine direction M is the cross direction C or transverse direction. The filter media 10 is shown as a substrate 11 that exhibits filtration properties. The filtration media 10 can be referred to as a corrugated substrate 12 because of the plurality of corrugations 13 extending across the filter media 10 from a first edge 14 to a second edge 16. The plurality of corrugations 13 are shown extending continuously in the machine direction M. The number of corrugations across the filter media 10 depends on the length of the cross direction C and the corrugation density (the number of corrugations per unit length from the first edge 14 to the second edge 16). The plurality of corrugations 13 helps provide the filtration media 10 with strength and rigidity compared to a noncorrugated substrate of the same material.

The filter media 10 includes a first side 20, and a second side 22 opposite the first side 20. The plurality of corrugations 13 can be characterized as including a plurality of first crests 24 along the first side 20 of the corrugated substrate 12 and generally extending in a direction away from the second side 22, and a plurality of second crests 26 formed along the second side 22 and generally extending in a direction away from the first side 20. Each corrugation 13 can be considered as including a first crest 24 and a second crest 26. From the perspective of FIG. 1 viewing the first side 20, the plurality of second crests 26 can be perceived as a plurality of first troughs 28 so that the plurality of corrugations 13 can be considered as alternating first crests 24 and first troughs 28. From the perspective of FIG. 3 viewing the second side 22, the plurality of first crests 24 can be perceived as a plurality of second troughs 30 so that the plurality of corrugations 13 can be considered as alternating second crests 26 and second troughs 30.

Figure 5A:
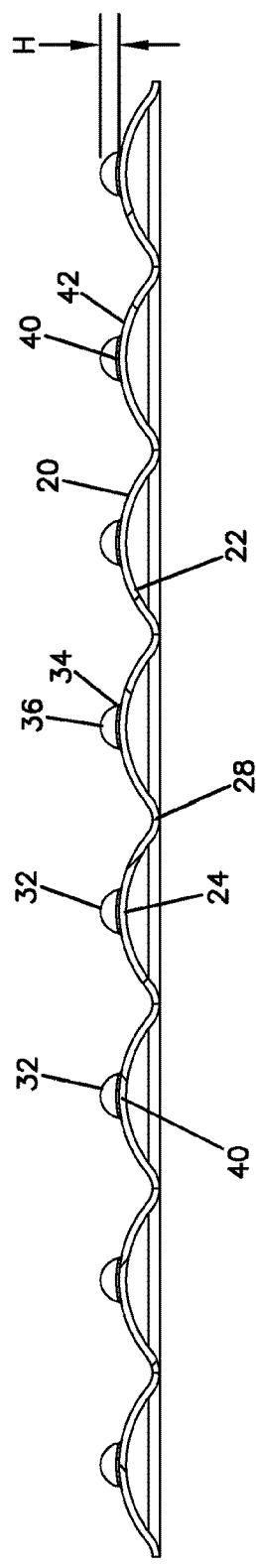
FIGS. 5A and 5B are section views of the filtration media substrate of FIG. 1 taken along lines A-A and B-B, respectively.

The filter media 10 includes a plurality of bosses 31. The plurality of bosses 31 can be provided as a plurality of first bosses 32 and a plurality of second bosses 33. The plurality of first bosses 32 are provided located along the plurality of first crests 24, and the plurality of second bosses 33 are provided located along the plurality of second crests 26. The plurality of first bosses 32 are provided extending from a base 34 to a top 36 in a direction away from the plurality of first troughs 28. The plurality of first bosses 32 are shown extending in a direction away from the second side 22. That is, the plurality of first bosses 32 are shown projecting above the plurality of first crests 24. Referring to FIG. 5A, the plurality of first bosses 32 are provided having a height H extending from a boss base 34 to a boss top 36. The boss base 34 is preferably located at the crest top 40 that forms the peak or maximum of a crest in order to achieve the most benefit of the boss height H. While the boss base 34 is preferably located at the crest top 40, it should be understood that the boss base 34 may be offset so that it is not exactly formed at the crest top 40 but instead may be located on the crest rise 42 proximate the crest top 40 but not at the crest top 40. The difference in height between the crest top 40 and the crest rise 42, if the boss is located on the crest rise 42, may result in a boss height H that is less than the idealized boss height which is the distance between the boss base 34 and the boss top 36. Accordingly, by locating a boss on the crest rise 42, it is expected that the boss height H will be less than if the boss were located at the crest top 40.

Figure 4:
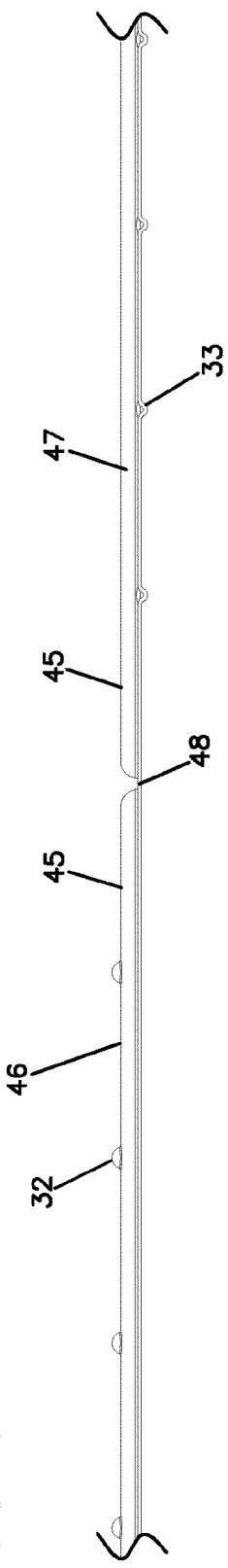
FIG. 4 is a side view of a portion of the filtration media substrate of FIG. 1.
Figure 5B:
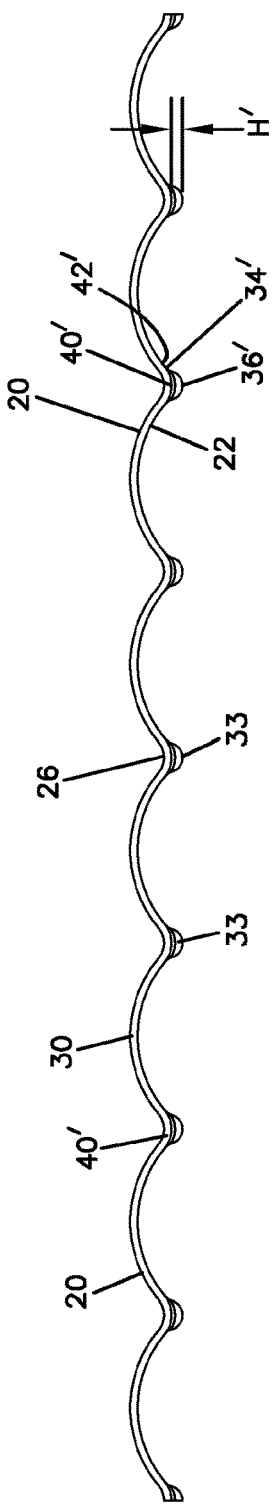

The plurality of second bosses 33 are located along the plurality of second crests 26 and are provided extending from a base 34' to a top 36' in a direction away from the plurality of second troughs 30. The plurality of second bosses 33 are shown extending in a direction away from the first side 20. That is, the plurality of second bosses 33 are shown projecting below the plurality of second crests 26 (for example, from the perspective of FIG. 4). Referring to FIG. 5B, the plurality of second bosses 33 are provided having a height H' extending from the boss base 34' to the boss top 36'. The boss base 34' is preferably located at the crest top 40' that forms the peak or maximum of the second crests 26 in order to maximize the boss height H. While the boss base 34' is preferably located at the crest top 40', it should be understood that the boss base 34' may be offset so that it is not exactly formed at the crest top 40' but instead may be located on the crest rise 42' proximate the crest top 40' but not at the crest top 40'. The difference in height between the crest top 40' and the crest rise 42', if the boss is located on the crest rise 42' may result in a boss height H' that is less than the idealized boss height which is the distance between the boss base 34' and the boss top 36'. Accordingly, by locating a boss on the crest rise 42', it is expected that the boss height H will be less than if the boss were located at the crest top 40'.

The boss height of the plurality of bosses 31 is preferably sufficient so that, when the filter media 10 is pleated, the plurality of bosses 31 help prevent the pleat faces 45 from touching each other except where the plurality of bosses 31 touch the pleat faces 45. Accordingly, by providing that the tops of the plurality of bosses 31 touch the opposing pleat face, the only areas of masking are the areas where the tops of the bosses touch the opposing pleat faces. As a result, fluid is able to move between the pleat faces and the remainder of the pleat faces are available for filtration.

The filter media 10 can be prepared so that it can be folded into a pleated arrangement. For the filter media 10, a score or crease 48 can be provided separating the pleat faces. In general, the filter media 10 will form a pleat tip at the score or crease 48. As shown in FIG. 1, the filter media 10 includes two pleat faces 46 and 47 that are separated by the score or crease 48. The length of the pleat faces 45 can be selected as the distance between score or crease areas 48. The score or crease areas 48 can be introduced by creating a crease in the filter media so that the media can be folded. While forming the filter media, the filter media can be scored by applying an edge to the filter media supported by a backing. In particular, the scoring can occur in alternating directions so that the filter media can be folded conveniently in a zigzag pattern.

The bosses refer to a raised region of a three dimensional projection from a surface of the filter media. The bosses can also be referred to as dimples and can be created by embossing or dimpling. One technique for forming the bosses includes pressing the filtration media between two plates so that the bosses or dimples are formed from the projection and recesses provided in the plates. Alternatively, the bosses or dimples can be created by other techniques that generally involve a deformation of the filter media to create the bosses or dimples. The bosses or dimples are preferably prepared in a way that does not result in a tearing or cutting of the filtration media. The embossing or dimpling can be done after corrugating, and can be done before the wet laid fiber has been cured. The embossing or dimpling can be done after curing the filter media, but it is expected that there will be a greater level of spring back compared to embossing or dimpling prior to curing the filter media.

The plurality of bosses are formed so that they extend in a direction away from the filter media. The plurality of bosses 32 and 33 in FIG. 4 are shown extending away from the filter media 10 even though the plurality of bosses 32 and 33 are actually part of the filtration media 10. The phrase "in a direction away from" means that the bosses project outwardly from a convex surface (for example, away from the corrugations) rather than inwardly (for example, into the corrugations). By extending away from the filter media, the bosses are available to provide separation between adjacent pleat faces. It should also be noted that in place of bosses, the desired separation could be achieved using beads of adhesive or polymer. The beads could be placed similarly to the bosses to achieve separation between adjacent sheets of media. Further, the beads could be placed to contact the adjacent sheet of media prior to the bead curing. In this example, the bead adheres to both adjacent pleat faces. Stretching of the bead could also be induced during the curing process to cause the bead to elongate and provide additional separation between the adjacent sheets of media if desired. In contrast, bosses that extend toward the filtration media would not be available to provide separation between adjacent pleat faces.

For the filtration media 10, the pleat faces 45 include a first pleat face 46 and a second pleat face 47. The length of the first pleat face 46 and the second pleat face 47 correspond to the pleat depth of the resulting pleated media pack once the filtration media 10 is folded in a zigzag configuration. The plurality of first bosses 32 are shown extending from the plurality of first crests 24 in the region of the first pleat face 46 and do not extend from the plurality of the first crests 24 located in the second pleat face 47. Similarly, the second plurality of bosses 33 are shown extending from the plurality of second crests 26 in the second pleat face 47 but do not extend from the plurality of second crest 26 located in the first pleat face 46. Accordingly, the plurality of first bosses 32 can be located in the first pleat face 46 and not the second pleat face 47, and the plurality of second bosses 33 can be provided in the second pleat face 47 and not the first pleat face 46. As a result, when the filtration media 10 is folded into a pleated configuration, the plurality of first bosses 32 provide separation between the pleat faces 46 and 47 as a result of extending from the pleat face 46 without also extending from the pleat face 47 that might engage the plurality of bosses 32 on the first pleat face 46. Similarly, the plurality of second bosses 33 can be provided for separating the pleat faces 46 and 47 as a result of extended from the pleat face 47 without also extended from the first pleat face 46 and contacting the plurality of second bosses 33 on the second pleat face 47. If bosses exist along the same crest on opposite pleat faces, several possibilities exist. One possibility is that the bosses will engage each other thereby creating, in certain circumstances, increased separation which may or may not be desirable. In general, it is expected that with the movement of the pleat faces relative to each other, it can be difficult to ensure that bosses on opposite pleat faces and on a same crest will contact each other only on boss tops. It is more likely that the bosses would contact each other along their sides thereby increasing masking because the masking now exist along a potentially greater area of contact that may include the sides of the bosses as well as where the bosses touch an opposing pleat face. In addition, the increased number of bosses may interrupt flow of fluid between the flow faces. Although the pleated media 10 is shown with a plurality of first bosses 32 on the first on the first pleat face 46, and a plurality of second bosses 33 on the second pleat face 47, it should be appreciated that the first plurality of bosses 32 can be provided in both the first pleat face 46 and the second pleat face 47, and the plurality of second bosses 33 can be provided in both the first pleat face 46 and the second pleat face 47, if desired. The bosses can be formed by alternately pressing the filtration media 10 in the first pleat face 46 and the second pleat face 47. For example, the plurality of first bosses 32 can be formed by pressing the first pleat face 46 from the second side 22, and the plurality of second bosses 33 can be formed in the second pleat face 47 by pressing from the first side 20.

The filtration media 10 can be provided with only the plurality of first bosses 32 or only the plurality of second bosses 33. In the case where the plurality of bosses extend from the plurality of first crests 24 or from the plurality of second crests 26, it is preferable that the plurality of bosses 32 can be arranged so that the plurality of bosses provide separation between pleats on the downstream side of the filter media 10. In typical applications, the fluid to be filtered (such as air) flows from the upstream side of the filter media 10 to the downstream side of the filter media 10. It is the flow through the filter media 10 from the upstream side to the downstream side that provides for filtration. In the case of pleated media, fluid flowing to the upstream side has a tendency to keep the pleats on the upstream side separated. Furthermore, this fluid flow also has a tendency to push the downstream side of the pleats together. Accordingly, by locating the plurality of bosses on the downstream side of the filter media 10, the plurality of bosses can help keep the pleats separated. Accordingly, in such situations, it may be possible to forego the presence of a plurality of bosses on the upstream side and only provide for the presence of a plurality of bosses on the downstream side of the filter media.

It is generally recognized that when pleat faces touch each other, the location of the media that touches each other has a tendency to become masked, and masked media is generally unavailable for filtration. Accordingly, when large surfaces of filtration media touch each other, there is a tendency for the filter media to lose filtration capacity as a result of the loss of surface area available for filtration. In addition, the presences of masking can increase pressure drop. By minimizing the amount of surface area that becomes masked, filtration capacity can be increased and pressure drop can be decreased. In the case of corrugated filtration media that does not include a plurality of bosses for separating pleat faces, it is expected that crests of corrugations will generally align with each other and, unless separated, there may be significant masking along the crests where the adjacent media touches each other. By introducing a plurality of bosses that have the effect of separating the adjacent sheets of filter media, the amount of surface area lost to masking generally corresponds to the surface area of the boss tops 42 and the surface area of the corresponding crest (or trough) that touches the boss tops 42. Accordingly, a significant amount of masking can be decreased by utilizing a plurality of bosses to separate adjacent sheets of filter media.

The corrugated substrate used for filtration can be characterized by the amplitude and frequency of the corrugations. In general the amplitude refers to the distance between adjacent peaks, and the frequency can refer to the number of full corrugations per unit distance. If the amplitude is almost zero, then the filtration media can be considered non-corrugated. When the corrugations are extending in the machine direction, the distance in the frequency measurement is measured from the first edge 14 to the second edge 16. A full corrugation refers to the combination of an adjacent first crest and first trough. The values of amplitude and frequency depend on the properties and chemistry of the filtration media. It is often desirable to use cellulosic media for filtration purposes because it is generally less expensive compared to media containing synthetic fibers. In general, cellulosic media is useful for filtration in applications such as engine air filtration, gas turbine filtration, and engine liquid system filtration and typically has a basis weight in a range of about 48 lb/3,000 ft$^2$ to about 75 lb/3,000 ft$^2$. For such cellulosic media, and for other media containing synthetics and/or materials in addition to cellulose (for example, cotton or other natural fibers). The amplitude can be sufficient to provide the filtration media with increased rigidity compared with otherwise identical but non-corrugated filtration media. Further, the corrugations can include minor corrugations or ridges within the corrugations to add additional stiffness to the pleats. A desirable amplitude that can provide increased rigidity is at least about 5 mils wherein one mil is equivalent to 0.001 inch. A desirable amplitude can be about 150 mils or less. An exemplary range of amplitude can be about about 5 mils to about 150 mils. In the case of filtering air for engine intake systems, the amplitude of the filtration media can be about 5 mils to about 75 mils, about 10 mils to about 60 mils, and can be about 20 mils to about 50 mils. In the case of deep panels for use in systems such as gas turbine system, the corrugations can be about 60 mils to about 150 mils, and can be about 80 mils to about 120 mils. The frequency can be about 125 mils to about 1000 mils. In addition, the frequency can be about 200 mils to about 600 mils, and can be about 250 mils to about 500 mils.

The plurality of bosses are preferably provided along a crest of a corrugation and provide a sufficient height to prevent adjacent media from touching and at a sufficient distribution so that the media resists deflection between bosses that would other cause the deflected media on adjacent sheets to touch. Preferably, the plurality of bosses are provided along each crest of a corrugation to help maintain separation between pleat faces. The bosses are preferably arranged along a corrugation crest and separated by at least about 0.25 inch to provide sufficient separation between adjacent bosses so that fluid can flow between the adjacent bosses. In addition, the bosses are preferably spaced along a corrugation crest so that the filter media does not deflect so that the filter media of opposing faces touch between adjacent bosses. The boss spacing can be non-uniform and can vary, for example, by increasing or decreasing the density of the bosses along the length of the corrugation or transversely. Further, the boss shape or height can be non-uniform and can vary, for example, by increasing or decreasing the height of the bosses along the length of the corrugation or transversely. The separation can be about 0.25 inch to about 1.0 inch, and can be about 0.40 inch to about 0.85 inch. The bosses can be referred to as projections or embossments. In general, the bosses can have any shape that provides the desired separation effect between adjacent sheets of media. Further, the boss shapes can span a larger area than spherical or truncated conical bosses. They can take on irregular shapes and can, for example, be elongated in either the lateral or transverse direction to add stiffness to the corrugation and the pleats. Exemplary boss shapes include spherical and truncated conical. These shapes are expected to be the least likely to tear as a result of forming the bosses. The bosses can be formed by pressing the media into a desired shape using, for example, a press plate. The spherical and truncated conical shapes on the press plate can be provided with soft edges so that they do not tear the filter media when the press plate is applied to the filter media. In general, the height of the plurality of bosses should be sufficient to provide separation between adjacent media sheets. The boss height can be at least about 5 mils (0.005 inch) in order to provide separation. If the height of a boss is less than 5 mils, then the boss may not provide sufficient separation between adjacent sheets of filter media. Furthermore, the height of the plurality of bosses should not be so great that it causes tearing of the media during formation of the bosses. In the case of cellulosic media having a basis weight of about 48 to 75 lb/3,000 ft$^2$, it is expected that the boss height will be less than about 50 mils. Exemplary boss height ranges include about 5 mils to about 50 mils, about 7 mils to about 40 mils and about 10 mils to about 30 mils. In addition, the base of a boss can have a perimeter that is sufficient to provide the desired boss height without tearing the media to achieve the boss height. For an exemplary conical shaped boss, the plurality of bosses having that conical shape can have a base perimeter of about 10 mils to about 60 mils. The boss top is preferably spherical in shape or provided with an arc shape thereby avoiding hard angles that may have a tendency to tear during formation of the boss.

Pleated Media Pack

Figure 6:
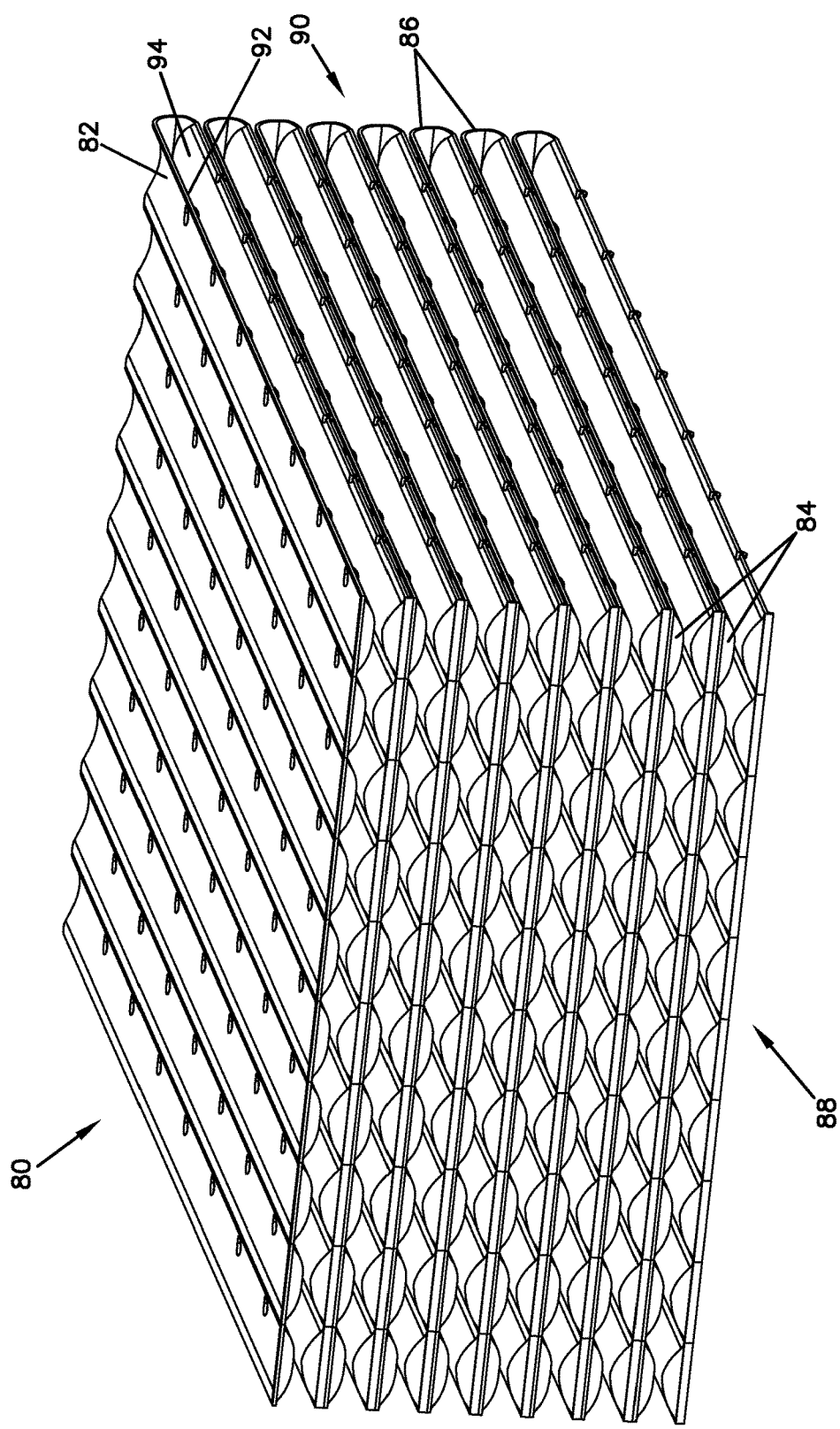
FIG. 6 is a perspective view of a pleated media pack of the filtration media substrate of FIG. 1 showing a first flow face.
Figure 7:
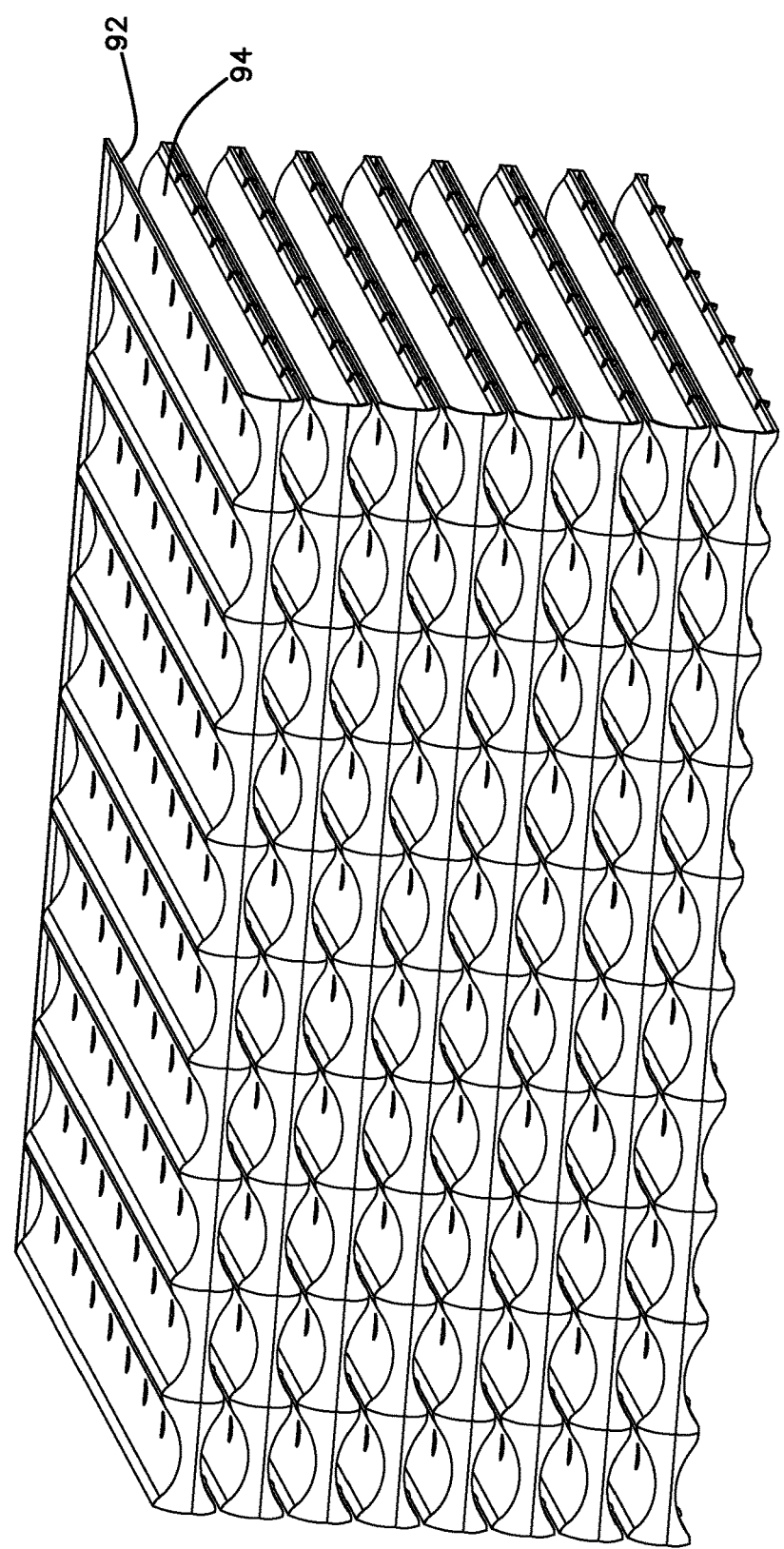
FIG. 7 is a perspective view of the filter media pack of FIG. 7 showing a second flow face.
Figure 8:
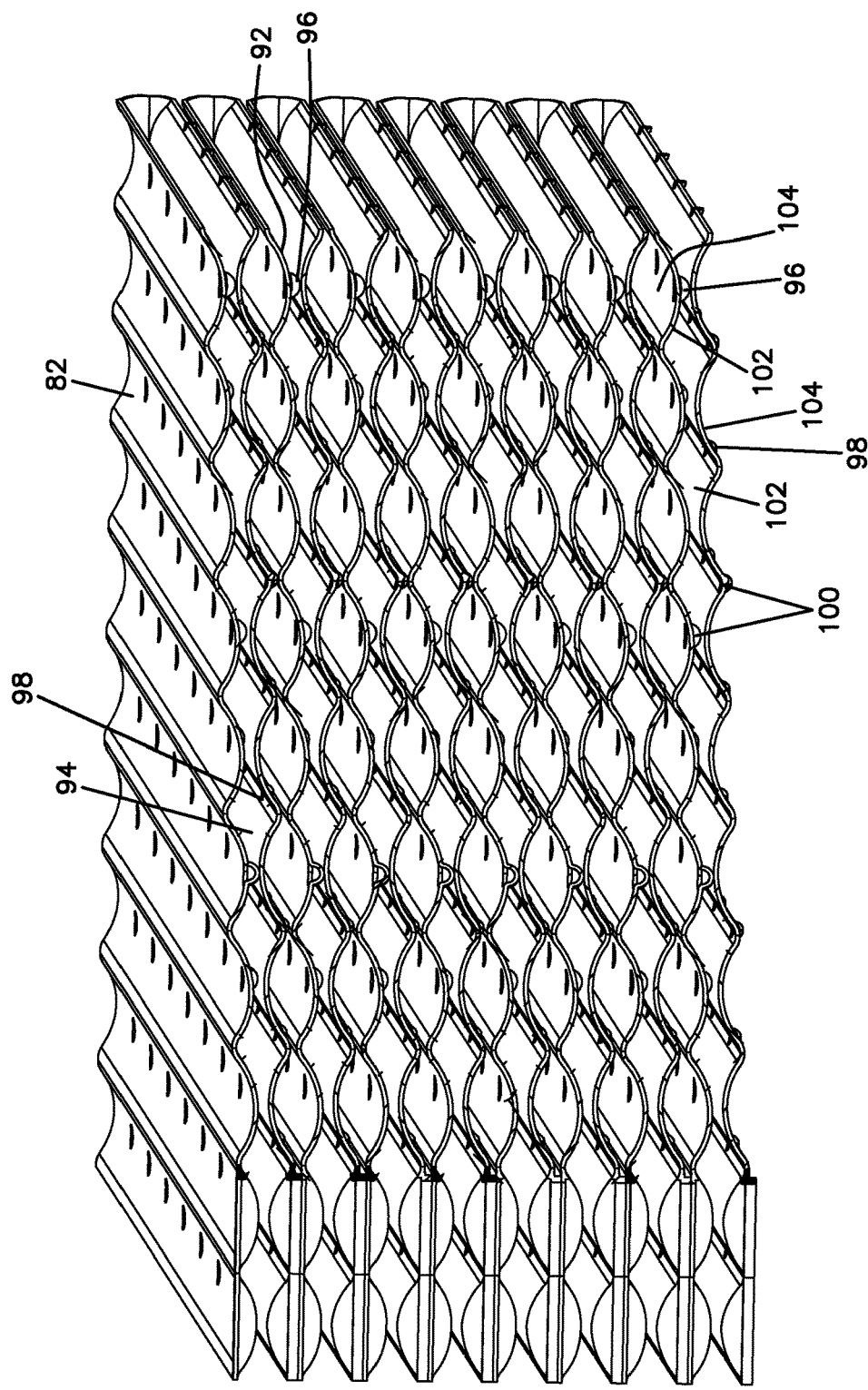
FIG. 8 is a partial sectional view of the filtration media pack of FIG. 7.

Now referring to FIGS. 6-8, a portion of a pleated media pack is shown at reference number 80. The pleated media pack 80 is shown with the filter media 82 folded back and forth upon itself in a zigzag pattern as a result of folding at the pleat tips 84 and 86. The pleat tips 84 form a first flow face 88 and the pleat tips 86 form a second flow face 90. The pleated media pack 80 can be characterized as having a volume asymmetry because it provides a greater volume on the first pleat face 88 side compared to the second pleat face 90 side. In many applications, it may be desireable to provide the side of the pleated media pack having a greater volume as the inlet side, and provide the side of the pleated media pack having the lesser volume as the outlet side. This type of configuration provides for greater loading of particulates on the inlet side. In general, volume asymmetry refers to one side of the media pack having a volume that is at least 10% greater than the volume of the other side of the media pack. The upstream side refers to the volume of the media pack prior to filtration, and the downstream side refers to the volume of the media pack after filtration. The volume asymmetry can be achieved by the shape of the corrugation (for example, such as media pack 80) or by the arrangement of the media pack (for example, a cylindrical or conical media pack).

The filter media 82 can be considered a pleated form of the filter media 10 shown in FIGS. 1-4 wherein the first pleat face 46 and the second pleat face 47 form the first pleat face 92 and the second pleat face 94, respectively. As more clearly illustrated in FIG. 8, the first pleat face 92 includes a plurality of first bosses 96, and the second pleat face includes a plurality of second bosses 98.

The filter media 82 includes a plurality of corrugations 100, and the pleat tips 84 and 86 are shown folded across the plurality of corrugations 100. As more clearly shown in FIG. 8, the filter media 82 has a first side 102 and a second side 104 and, when folded into a pleat configuration, the first side 102 alternatively faces upwardly and downwardly, and the second side 104 alternately faces upwardly and downwardly in the configuration shown in FIGS. 6-8. This is a result of the filter media 82 being folded back and forth upon itself. In addition, the plurality of first bosses 96 are shown extending from the first side 102 in a direction away from the second side 104, and the plurality of second bosses 98 are shown extending from the second side 104 in a direction away from the first side 102. For the pleated media 82, the plurality of first bosses 96 are provided in the first pleat face 94 and not in the second pleat face 96, and the plurality of second bosses 98 are provided in the second pleat face 94 and not in the first pleat face 92. Accordingly, the plurality of first bosses 96 and the plurality of second bosses 96 are located in alternating pleat face, and are not present in the same pleat face in the filter media 82. It can be appreciated that the plurality of first bosses 94 and the plurality of second bosses 96 can be provided in the same pleat face, if desired.

Figure 9:
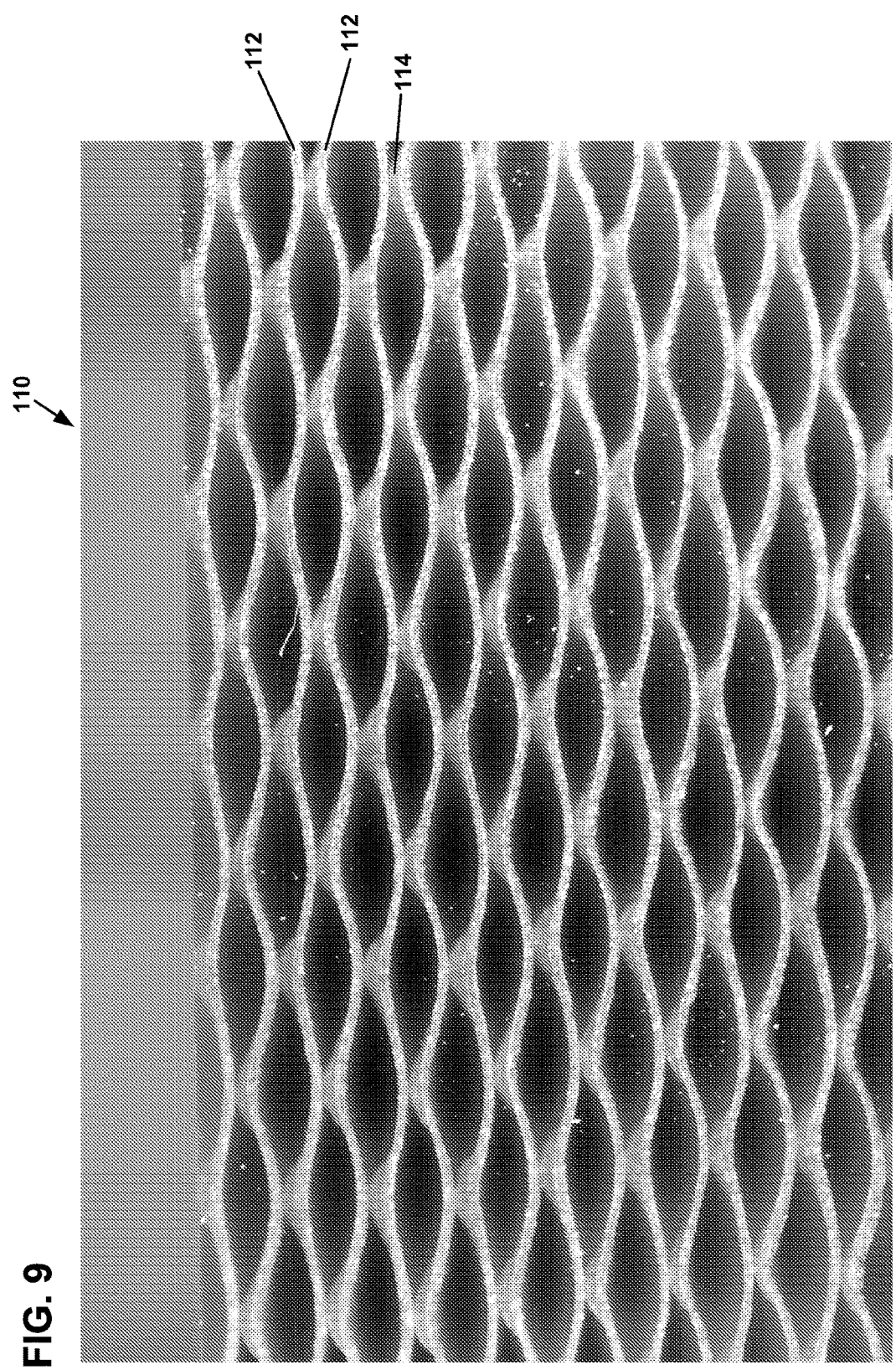
FIG. 9 is a photographic image of a sectional view of a filtration media pack.
Figure 10:
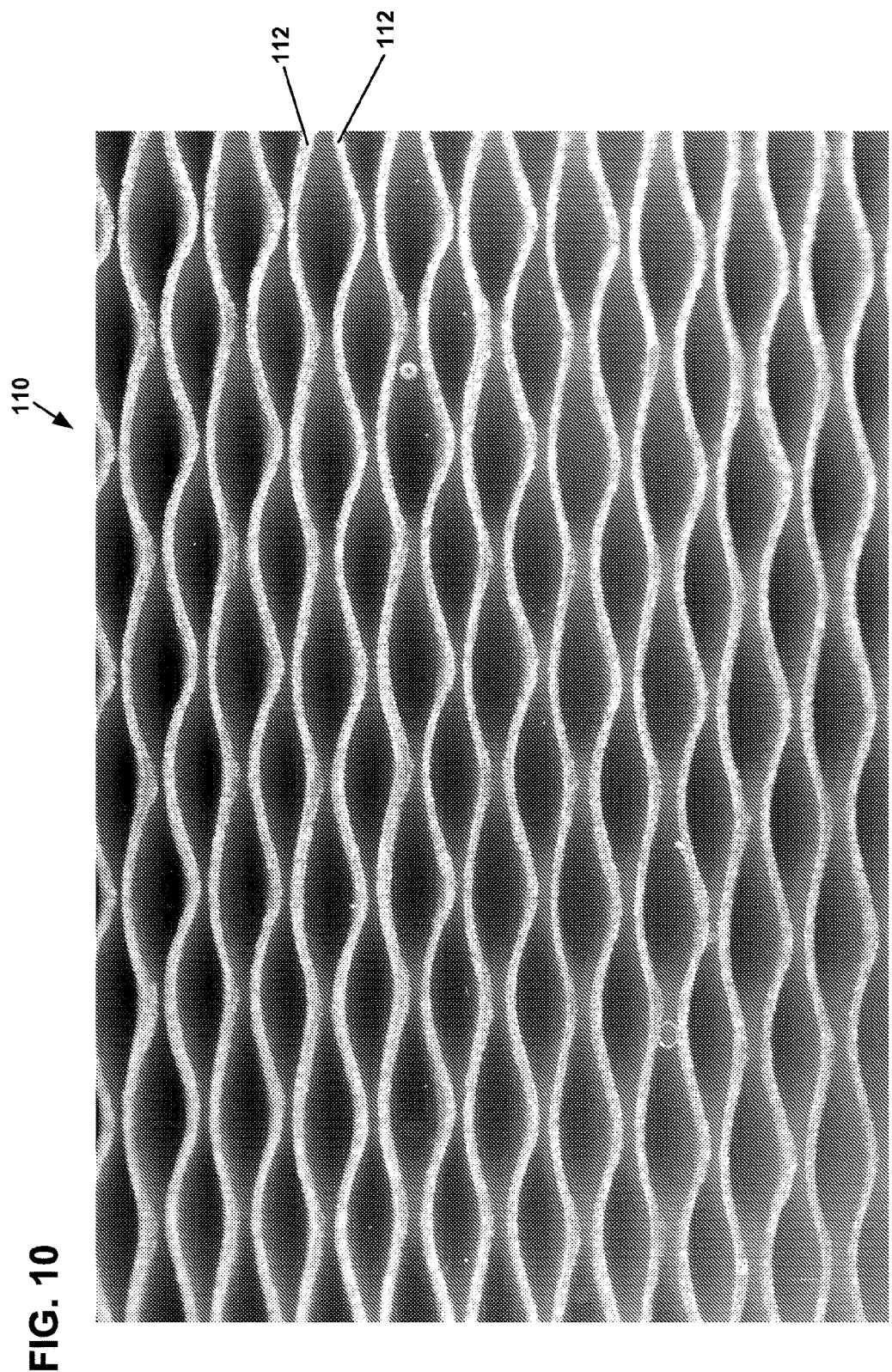
FIG. 10 is a photographic image of a sectional view of the filtration media pack of FIG. 9.

Now referring to FIGS. 9 and 10, images of a pleated filter media pack are shown at reference number 110. Both images are sectional views of the pleated media pack 110. In the case of FIG. 9, the image shows the pleated filter media pack 110 cut through the layers of filter media 112 relatively close to the plurality of bosses 114 so that the plurality of bosses 114 are clearly shown separating the layers of filter media 112. In contrast, the image of FIG. 10 shows a cut through the pleated filter media pack 110 further away from the plurality of bosses 114 so that the plurality of bosses 114 are almost not visible in the image and the layers of filter media at 112 appear to be floating in air away from each other.

Figure 11:
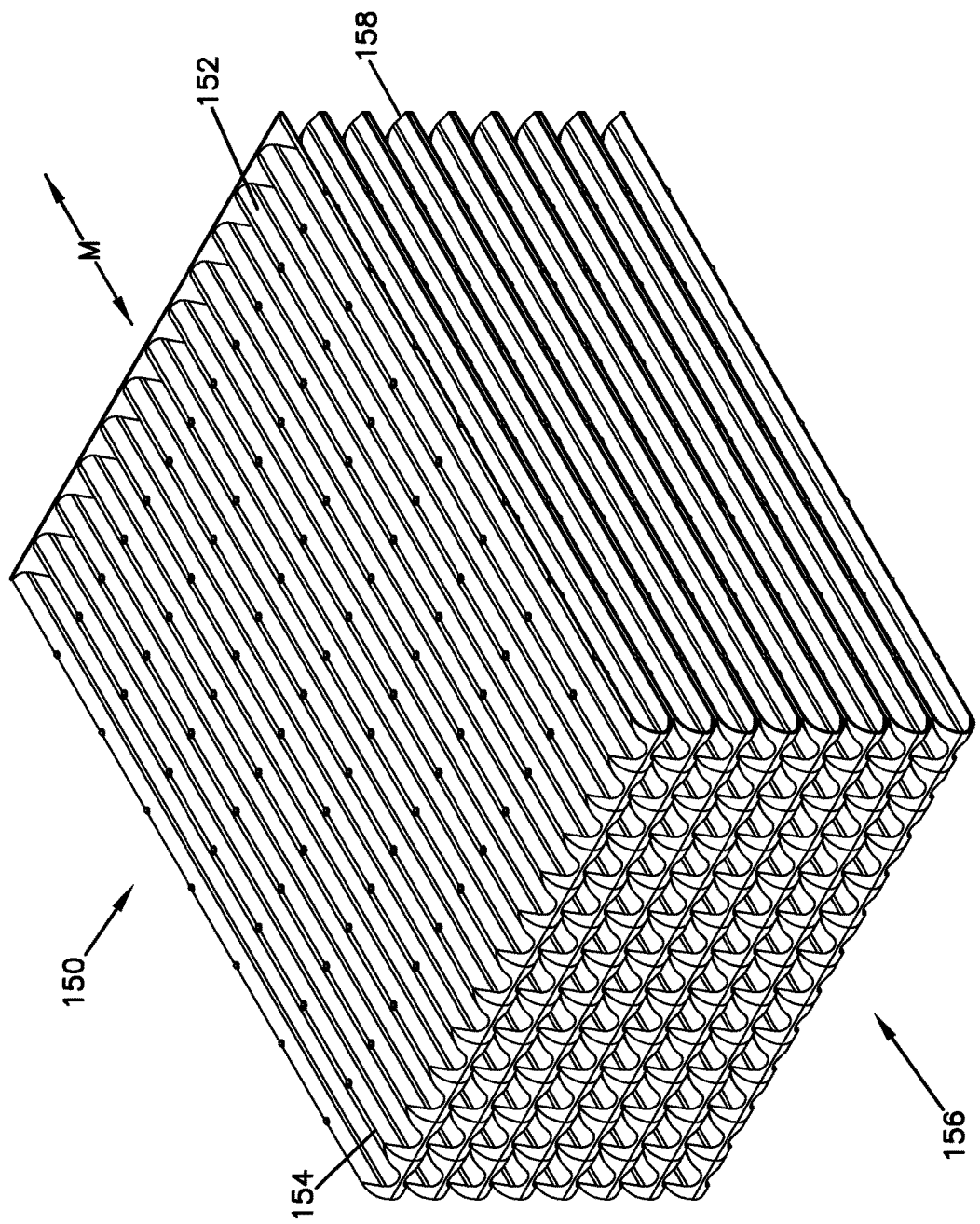
FIG. 11 is a perspective view of an alternative filtration media pack according to the principles of the present disclosure.
Figure 12:
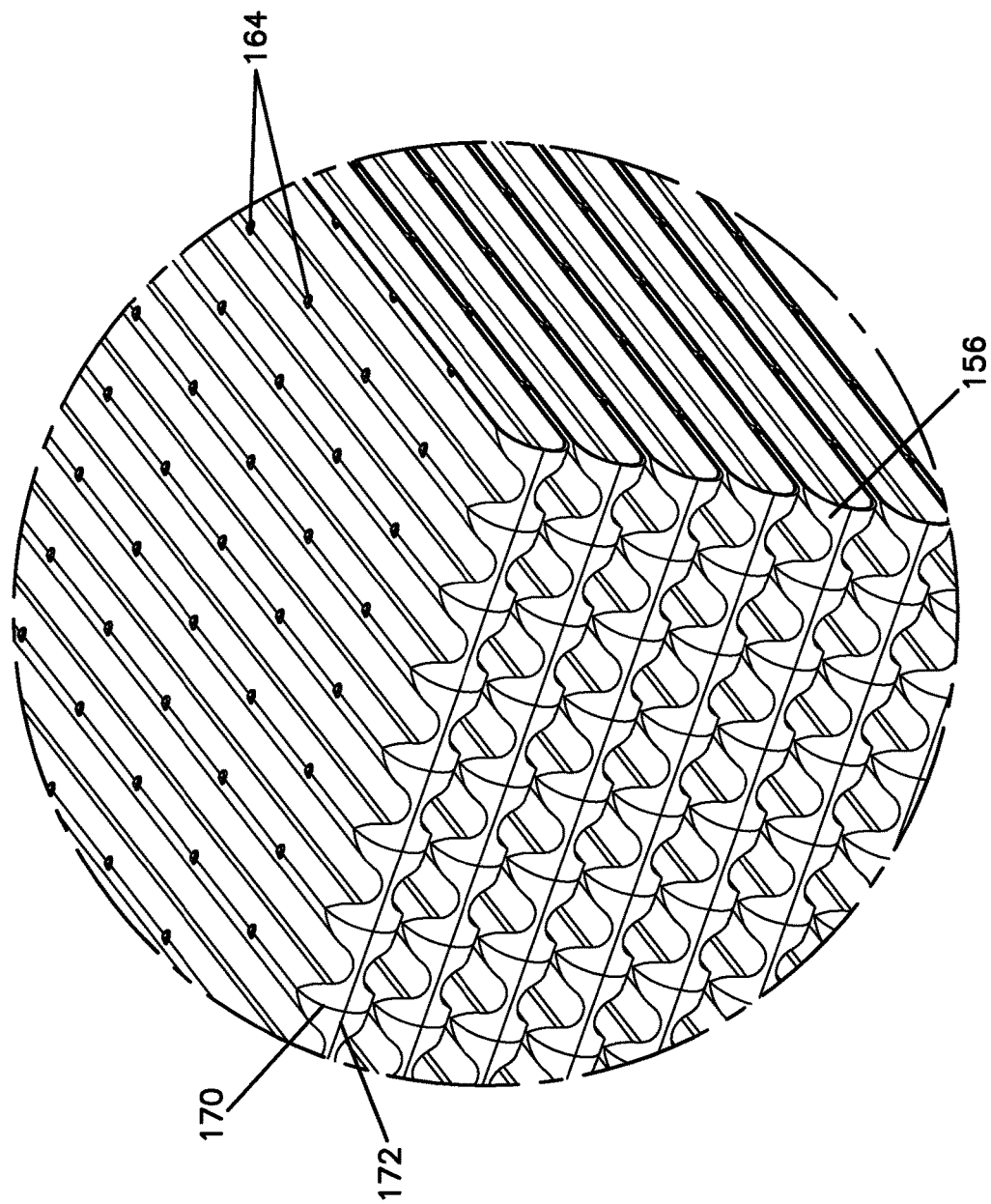
FIG. 12 is an alternative perspective view of a part of the filtration media pack of FIG. 11.
Figure 13:
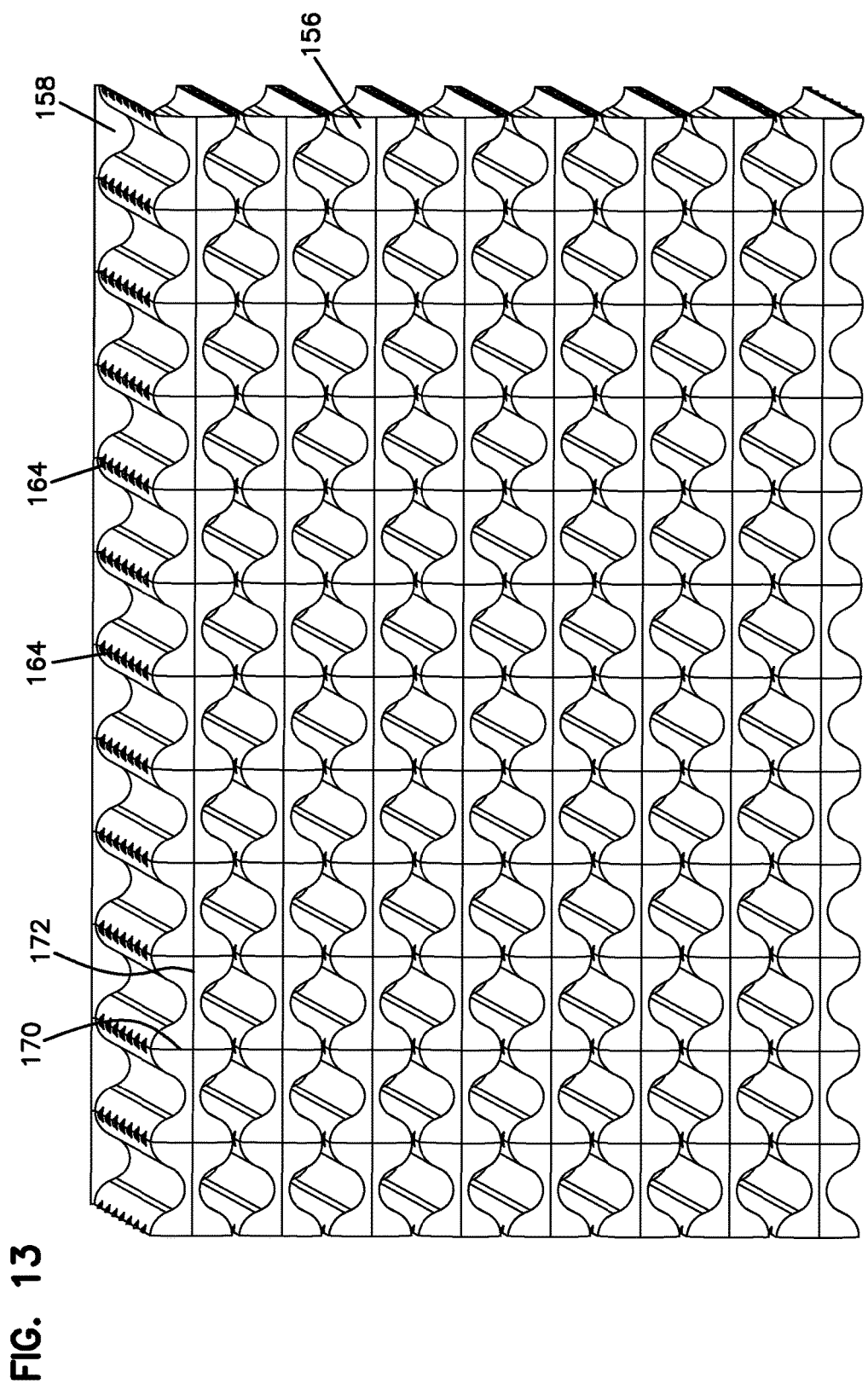
FIG. 13 is a side view of the filtration media pack of FIG. 11.

Now referring FIGS. 11-13, an alternative pleated filter media pack is shown at reference number 150. The filter media pack 150 is formed from filter media 152 that is folded into a pleated configuration. The filter media 152 includes a plurality of corrugations 154 extending in a machine direction M. The filter media pack 150 includes first pleat tips 156 and second pleat tips 158, and first pleat faces 160 and second pleat faces 162. Also shown are bosses 164. It is pointed out that the lines 170 and 172 shown in FIGS. 11-13 represent tangent lines to help illustrate the shape of the corrugations at the pleat tips.

The plurality of corrugations 154 can be characterized as "symmetric corrugations" because the volume on the inlet side of the filter media pack 150 can be considered as about the same as the volume on the outlet side of the filter media pack 150. For example, the difference in volume between the two sides, if a difference exists, is less than 10%. In contrast, in the case of the filter media pack shown in FIGS. 6-8, there is a difference in volume between the inlet side and the outlet side of the filter media pack that is greater than 10%. The plurality of corrugations in FIGS. 6-8 provide the media pack 80 can be characterized as "asymmetric corrugations." Furthermore, although the plurality of corrugations 154 can be characterized as "symmetric corrugations," the media pack 150 can be formed into a media pack that provides volume asymmetry by, for example, forming a cylindrical media pack.

Filtration Media Generally

The filtration media can be provided as a relatively flexible media, including a non-woven fibrous material containing cellulose fibers, synthetic fibers, glass fibers, or combinations thereof, often including a resin therein, and sometimes treated with additional materials. An example filtration media can be characterized as a cellulosic filtration media that can tolerate about up to twelve percent (12%) strain without tearing when wet and warm, but which will rupture at lower percent strain when dry and cold (as low as 3% with some media). The filtration media can be corrugated, embossed, scored or creased, and folded into a pleated configuration without unacceptable media damage. In addition, the filtration media is desirably of a nature such that it will maintain its corrugations, boss structure, and pleated configuration, during use. While some filtration media is available that can tolerate greater than about twelve percent (12%) strain, and such media can be used according to the invention, that type of media is typically more expensive because of the incorporation therein of synthetic fibers.

In the corrugating process, an inelastic deformation may be created in the filtration thereby preventing the media from returning to its original shape. The corrugation may sometimes tend to spring partially back, recovering only a portion of the stretch and bending that has occurred. Also, the media can contain a resin. During the corrugating process, the media can be heated to soften the resin. When the resin cools, it will help to maintain the corrugations. The formation of the bosses can be achieved by embossing the filter media. For example, the filter media can be placed between plates that, through pressure, create the bosses. Similar to the corrugating process, and in elastic deformation may be created in the filtration media thereby preventing the media from returning to its original shape. Although the media may tend to spring back partially, the extend of the embossing should result in a desired plurality of bosses. Furthermore, the plurality of bosses can be alternated between pleat faces so that the bosses extend in alternating directions in alternating pleat faces. That is, the bosses in a first pleat face may extend in a first direction, and the bosses in the adjacent pleat face may extend in the opposite direction. This pattern may continue. Furthermore, the corrugated and embossed media may be scored or creased at the location of the pleat tips to help when folding the filter media into a pleated configuration. The storing or creasing can occur as part of a continuous process wherein an edge is applied to the filter media across the corrugations and wherein the direction of the crease alternates between pleat faces. In addition, the distance between the scoring or pleat faces represents the pleat height of the subsequently folded pleated media pack.

The filtration media can be provided with a fine fiber material on one or both sides thereof, for example, in accord with U.S. Pat. Nos. 6,955,775, 6,673,136, and 7,270,693, incorporated herein by reference in their entirety. In general, fine fiber can be referred to as polymer fine fiber (microfiber and nanofiber) and can be provided on the media to improve filtration performance. As a result of the presence of fine fiber on the media, it can be possible to provide media having a reduced weight or thickness while obtaining desired filtration properties. Accordingly, the presence of fine fiber on media can provide enhanced filtration properties, provide for the use of thinner media, or both. Fiber characterized as fine fiber can have a diameter of about 0.001 micron to about 10 microns, about 0.005 micron to about 5 microns, or about 0.01 micron to about 0.5 micron. Exemplary materials that can be used to form the fine fibers include polyvinylidene chloride, polyvinyl alcohol polymers, polyurethane, and co-polymers comprising various nylons such as nylon 6, nylon 4,6, nylon 6,6, nylon 6,10, and co-polymers thereof, polyvinyl chloride, PVDC, polystyrene, polyacrylonitrile, PMMA, PVDF, polyamides, and mixtures thereof.

Several techniques can be relied upon for enhancing the performance of pleated filtration media. The technique can be applied to pleated filtration media used in panel filter arrangements and for pleated filtration media used in closed loop filter arrangement. Depending on whether the pleated filtration media is intended to be used in a panel filter arrangement or a closed loop filter arrangement, alternative preferences can be provided. In view of this disclosure, one would understand when certain preferences are more desirable for a panel filter arrangement and when certain preferences are more desirable for a closed loop filter arrangement.

Accordingly, it should be understood that the identification of a preference is not intended to reflect a preference for both panel filter arrangements and closed loop filter arrangements. Furthermore, it should be understood that the preferences may change as a result of whether the filter arrangement is intended to be an arrangement that can be characterized as a forward flow arrangement (where dirty air flows into the filter media pack from the exterior cylindrical surface) or a reverse flow filtration media pack (where dirty flows into the filtration media pack from the inner surface of the filtration media pack).

Filter Elements

Figure 14:
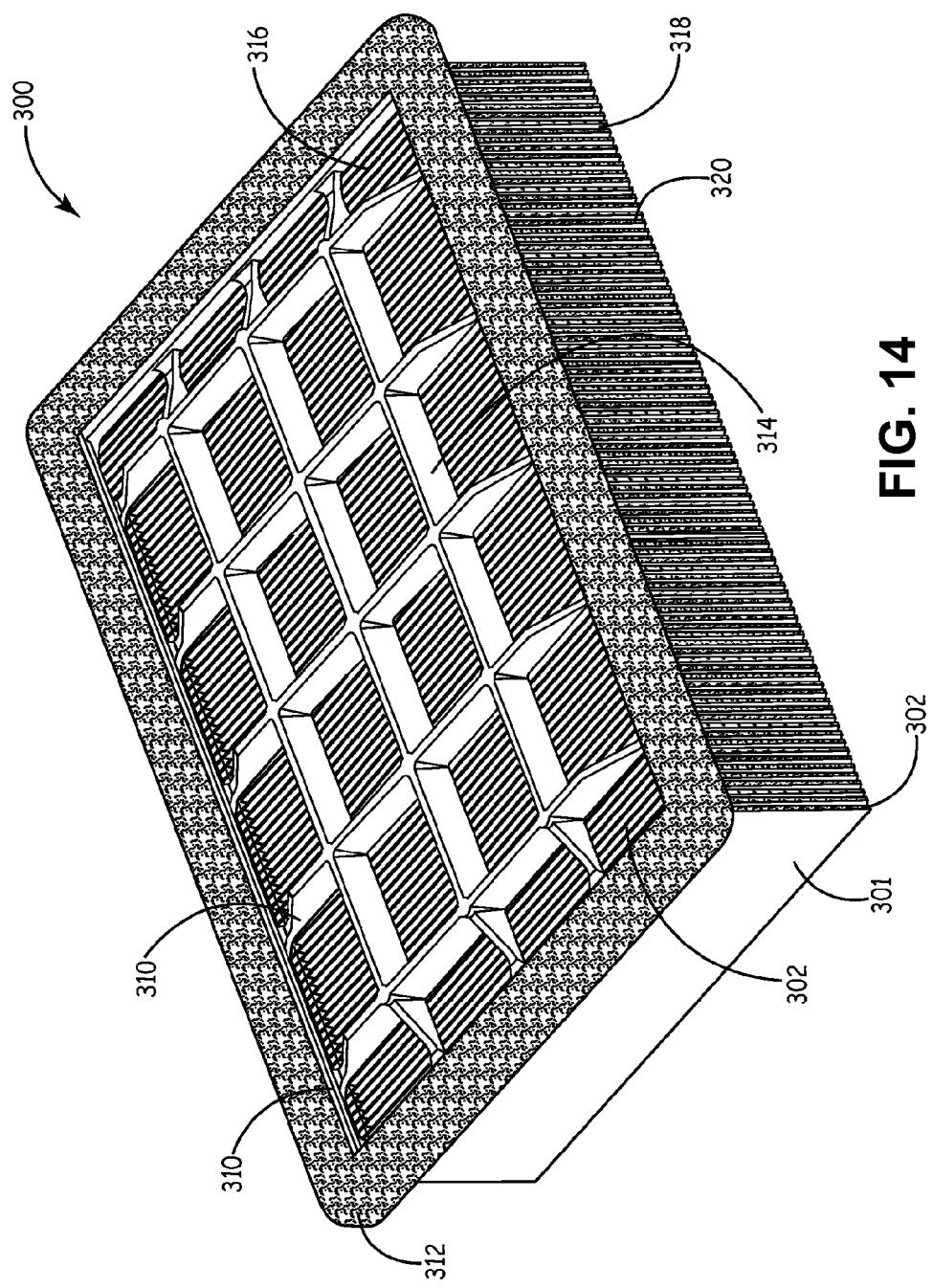
FIG. 14 is a perspective view of a panel filter element containing a pleated media pack.

The following filter elements are provided as examples constructed in accordance with the present invention, and are not intended to be all inclusive of element designs made in accordance with the teachings herein. Rather, one of skill in the art will appreciate that various alternative elements can be constructed while still within the scope of the disclosure and claims. In FIG. 14, a panel filter 300 is depicted. The panel filter 300 comprises filter media 301, pleated in a configuration comprising pleat folds 302. The panel 300 depicted includes a frame construction 310 having a seal arrangement 312 thereon. The seal arrangement 312 is generally configured to form a seal with a housing or other structure in which the panel filter 300 is positioned. The panel filter 300 also includes a support grid 314, across one surface of the panel filter arrangement 300.

While there are variations in panel filters from those shown in FIG. 14, in general the features are analogous, comprising: a plurality of parallel pleats; a seal arrangement secured within the panel filter; and, a rectangular configuration with one set of pleat folds 316 in a plane and the second set of pleat folds 318 in a separate plane. Ends or opposite edges 320 of the pleats can be closed by sealant, or by being encased in a mold or frame, if desired. Although not depicted in FIG. 14, plurality of the corrugations in the pleated media will often run substantially perpendicular to pleat folds 316 and 318 (although other non-perpendicular directions are also envisioned). Thus, the plurality of corruptions can extend in a direction from pleat folds 316 to pleat folds 318.

Figure 15:
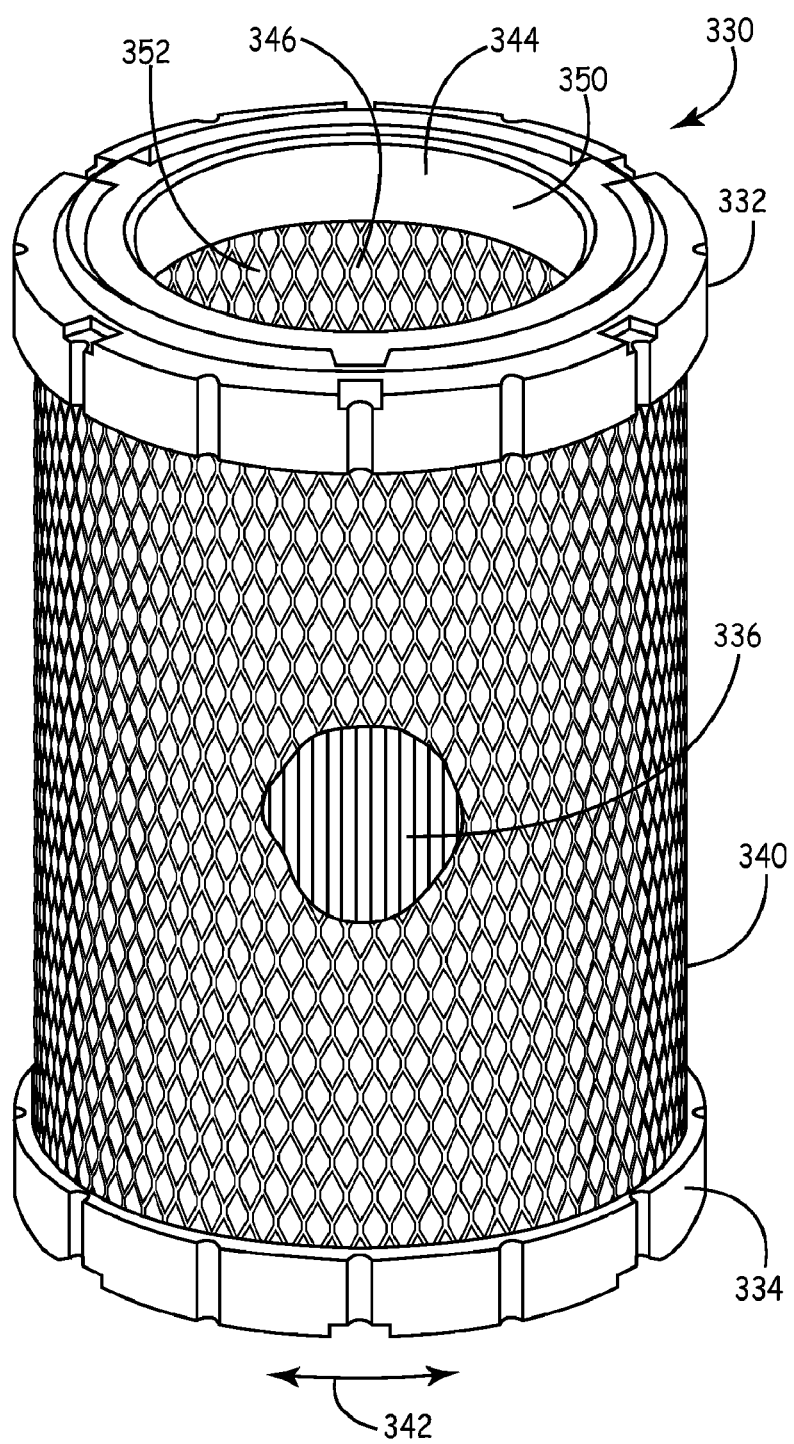
FIG. 15 is a perspective view of a cylindrical filter element containing a pleated media pack.
Figure 16:
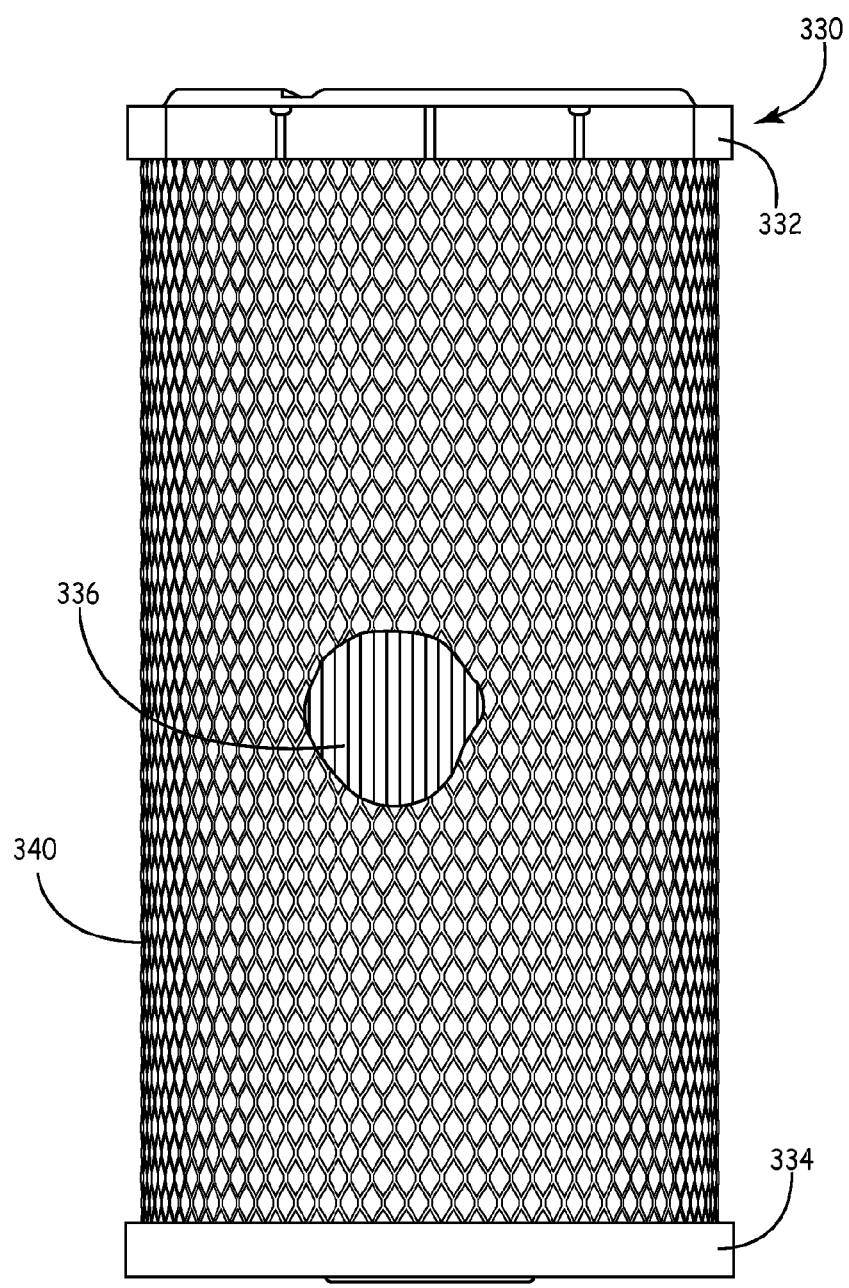
FIG. 16 is a side view of the cylindrical filter element of FIG. 15.

In other arrangements, the pleated media is configured or arranged around an open central area. An example of such a filter arrangement is depicted in FIGS. 15 and 16. Referring to FIG. 15, a filter arrangement 330 is depicted. The filter arrangement 330 comprises first and second end caps 332 and 334 having pleated media 336 extending therebetweeen. The pleats of the pleated media 336 generally extend in a direction between the end caps 332 and 334. The particular filter arrangement 330 of FIG. 15 has an outer liner 340, shown broken away at one location, for viewing pleats. Typically, although pleats can be viewed through the liner 340, the arrangement 330 is simply not drawn that way, for convenience. The outer liner 340 shown comprises expanded metal, although a variety of alternative outer liners, including plastic ones, can be used. In some instances, an outer liner is simply not used. Attention is also directed to FIG. 16, which is a side elevational view of arrangement 330, showing end caps 332 and 334. Pleat folds 336 are shown, as is outer liner 340. For the particular arrangement 330 of FIG. 15, a direction perpendicular to the pleat direction is generally a circumference of the filter arrangement 330, indicated by the double headed arrow 342.

The particular filter arrangement 330 depicted is generally cylindrical, although alternatives are possible. Typically, such elements as element 330 have an open end cap, in this instance corresponding to end cap 332, and a closed end cap, in this instance corresponding to end cap 334, although alternatives are possible. The term "open" when used in reference to an end cap, is meant to refer to an end cap which has an open central aperture 344 to allow air flow between an interior space 346 of the filter arrangement 330 and the exterior, without passage through the media 336. A closed end cap, by comparison, is an end cap which has no aperture therein. Although not depicted, flutes will typically be arranged in a direction from outer pleat folds of the pleated media 336 perpendicularly (or near perpendicularly) into the interior of the element toward the inner volume 346. However, it will be understood that the flutes do not have to run perpendicular to the outer pleat folds.

A variety of arrangements have been developed for end caps 332 and 334. The end caps may comprise polymeric material molded to the media. Alternatively they may comprise metal end caps or other preformed end caps secured to the media, with an appropriate adhesive or potting agent. The particular depicted end caps 332 and 334 are molded end caps, each comprising compressible foamed polyurethane. End cap 332 is shown with a housing seal 350, for sealing the element 330 in a housing during use. The depicted seal 350 is an inside radial seal, although outside radial seals and axial seals are also possible.

It is noted that the element may include an inner liner 352 extending between end caps 332 and 334 along an inside of the media 330 as shown in FIG. 15, although in some arrangements such liners are optional. The inside liner, if used, can be metal, such as expanded metal or perforated metal, or it can be plastic.

The distance between the outside cylindrical surface and the inside cylindrical surface, defined by outer and inner pleat folds, is generally referenced as the pleat depth.

Figure 17:
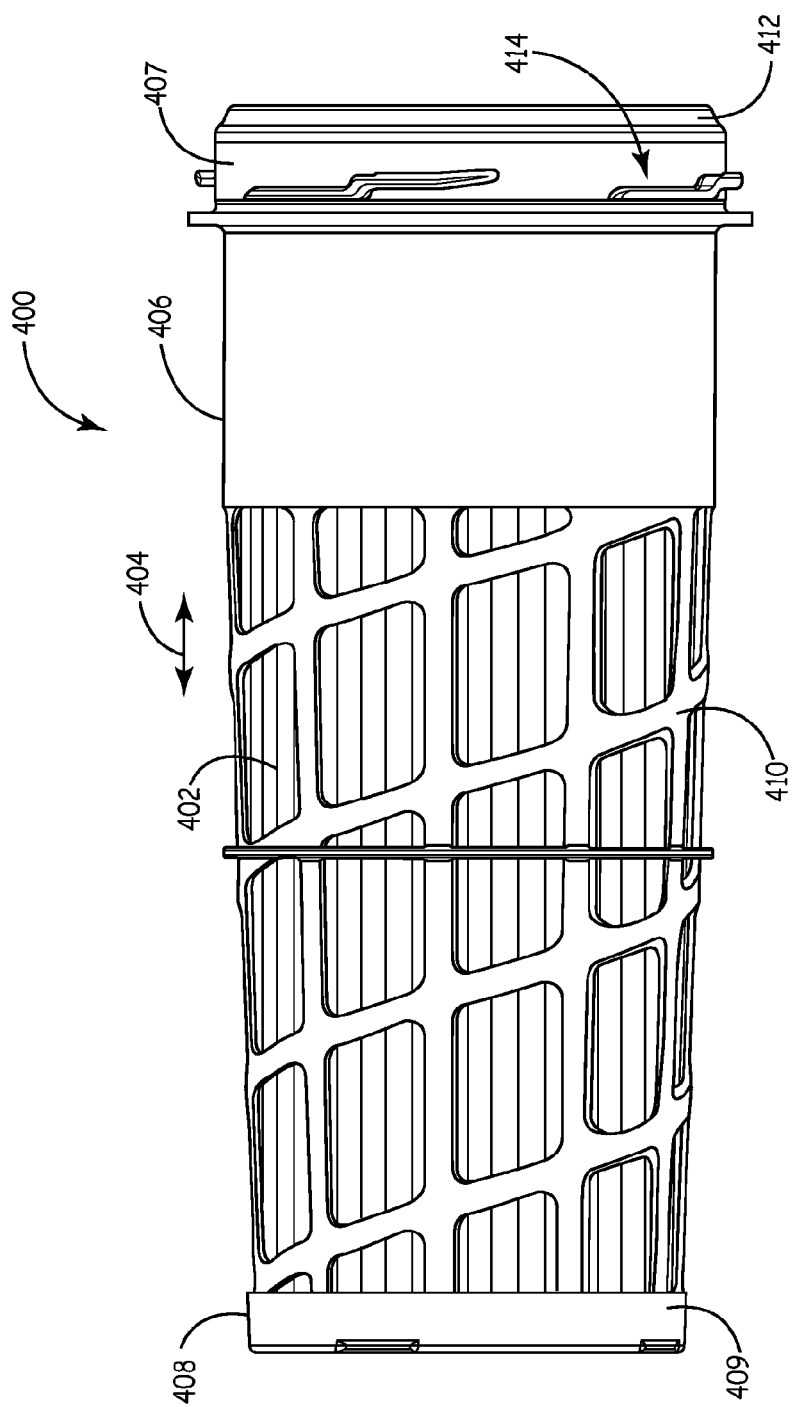
FIG. 17 is a side view of a conical filter element containing a pleated media pack.

An arrangement such as that depicted in FIGS. 15 and 16 are sometimes referenced herein as a "cylindrical arrangement," using "cylindrically configured" media, or by similar characterizations. Not all filter arrangements that utilize a closed loop configuration or tubular configuration are arranged as cylinders. An example of this is illustrated in FIG. 13. Referring to FIG. 17, a filter arrangement 400 comprises extension of media 402 which is pleated, with pleat direction extending in the directions of arrow 404. Filter arrangement 400 is somewhat conical having a wide end 406 and a narrow end 408. At wide end 406 is positioned an end cap 407, and at narrow end 408 is positioned an end cap 409. As with the cylindrical arrangement, a variety of open and closed end caps can be used. For the specific example depicted, end cap 407 is open and end cap 408 is closed.

Filter arrangement 400 includes outer support screen 410 extending between end cap 407 and 409. The particular arrangement 400 includes no inner support screen although one could be used. The filter element 400 includes a seal arrangement 412, in this instance an axial seal, although an inside or outside radial seal is possible. Element 400 includes a non-continuously threaded mounting arrangement, 414, for mounting a housing. The arrangement 400 is generally described in detail in PCT/US2003/33952 filed Oct. 23, 2003, incorporated herein by reference.

Figure 18:
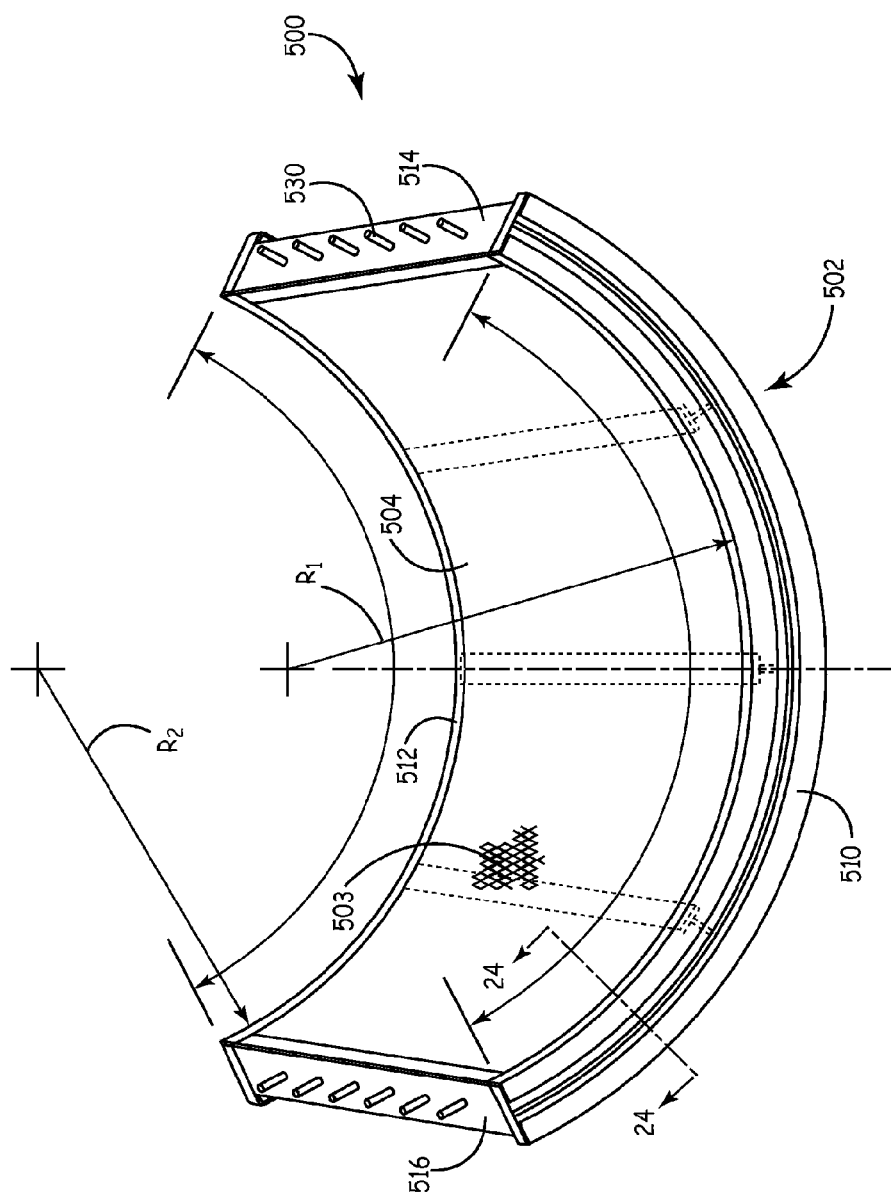
FIG. 18 is a perspective view of a partial conical or bowed panel filter element containing a pleated media pack.
Figure 19:
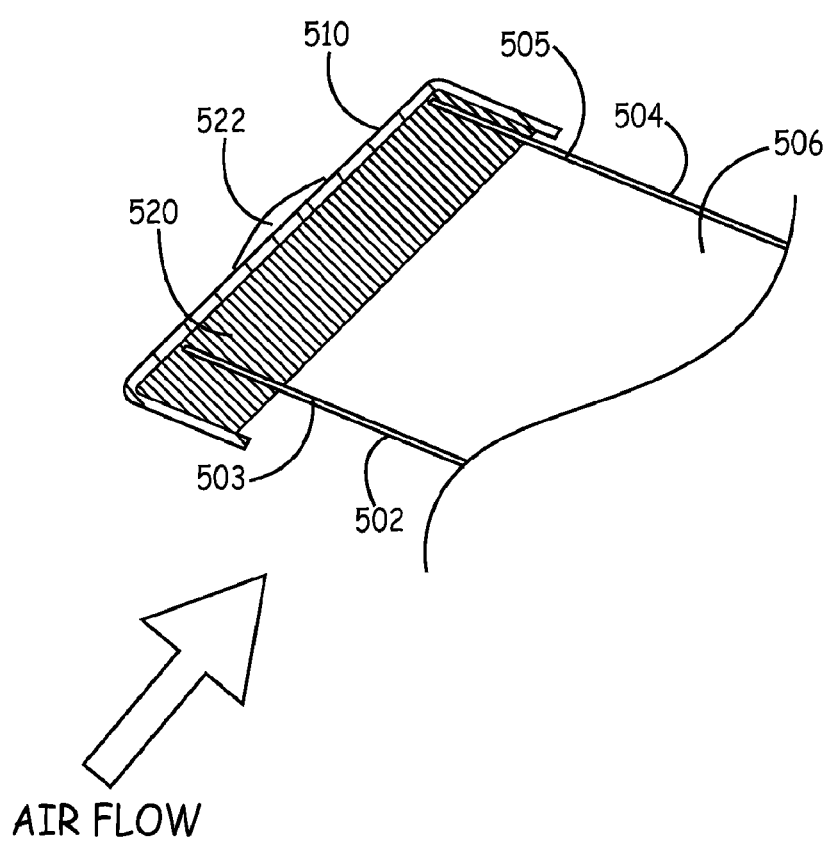
FIG. 19 is a sectional view of the filter element of FIG. 18 taken along lines 19-19.

Now referring to FIGS. 18 and 19, a filter arrangement is shown as reference number 500. The filter arrangement 500 can be considered to be a type of conical filter element and/or a type of panel filter element. The filter element 500 is shown having a first face 502 and a second face 504, with pleated media 506 extending between the first face 502 and the second face 504. Corrugations constructed in accordance with the discussion herein will typically be arranged directionally between the first and second faces 502, 504. The first face 502 includes a screen 503, and the second face 504 includes a screen 505. The filter element 500 includes a first side 510, second side 512, first end 514, and second end 516. The first side 510 and the second side 512 include a potting material 520 that help seals the sides of the pleated media 506, and a seal 522 that prevents fluid from bypassing the media 506 when the element 500 is arranged in an air cleaner. The first end 514 and the second end 516 seal the ends of the pleated media faces, and include guide pins 530 that help align the element 500 within the air cleaner.

The filter element 500 shown can be considered conical because the radius R1 is different than the radius R2. In general, the radius R1 refers to the radius at the first side 510 and the radius R2 refers to the radius at the second side 512. Although the filter element 500 is shown having a conical structure, it is possible for the radiuses R1 and R2 to be the same so that the filter element more closely resembles a partial cylindrical arrangement or, alternatively, as a bowed panel arrangement.

The filter elements can be utilized in various housing arrangements, and the filter elements can be replaced or cleaned or refurbished periodically, as desired. In the case of air filtration, the housing can be provided as part of an air cleaner for various air cleaning or processing applications including engine air intake, turbine intake, dust collection, and heating and air conditioning. In the case of liquid filtration, the housing can be part of a liquid cleaner for cleaning or processing, for example, water, oil, fuel, and hydraulic fluid.

The principles, techniques, and features describes herein can be applied in a variety of systems, and there is no requirement that all of the advantageous features identified be incorporated in an assembly, system, or component to obtain some benefit according to the present disclosure.

Some Selected Final Characterizations

In this summary, some selected, final summary characterizations of the teachings herein are provided. Some selected, final summary characterizations include:

1. Filter media comprising:
(a) a filtration substrate having a first side and a second side, and constructed for filtering a fluid by flow of the fluid therethrough from the first side to the second side or from the second side to the first side;
(b) the filtration substrate has a first edge and a second edge, and a first end and a second end, wherein the filtration substrate has a machine direction extending from the first end to the second end, and a cross direction extending from the first side to the second side;
(c) the filtration substrate comprising a plurality of corrugations located in the cross direction and extending in the machine direction;
(d) the plurality of corrugations comprising a plurality of first crests formed along the first side of the filtration substrate and a plurality of second crests formed along the second side of the filtration substrate; and
(e) the filtration substrate comprises a plurality of bosses located along the plurality of first crests or along the plurality of second crests and extending in a direction away from the other of the plurality of first crests or the plurality of second crests.

2. Filter media according to characterization 1, wherein the filter media is arranged in a roll wound along the machine direction.

3. Filter media according to characterization 2, wherein the filter media in a roll is arranged around a core and covered by a wrapper.

4. Filter media according to any one of characterizations 1-3, wherein the filter media comprises cellulosic media and has a basis weight of about 48 lb/3,000 ft$^2$ to about 75 lb/3,000 ft$^2$.

5. Filter media according to any one of characterizations 1-4, wherein the plurality of bosses comprise a result of embossing the filtration substrate.

6. Filter media according to any one of characterizations 1-5, wherein the plurality of bosses have a height of at least about 5 mils.

7. Filter media according to any one of characterizations 1-6, wherein the plurality of bosses have a height of about 5 mils to about 50 mils.

8. Filter media according to any one of characterizations 1-7, wherein the plurality of bosses comprise adjacent bosses spaced apart by a distance of at least 50 mils between bosses.

9. Filter media according to any one of characterizations 1-8, wherein the plurality of bosses comprise adjacent bosses spaced apart along a common crest by a distance of about 50 mils to about 1,500 mils.

10. Filter media according to any one of characterizations 1-9, wherein the plurality of bosses comprise a plurality of first bosses located along the plurality of first crests and extending in a direction away from the plurality of second crests, and a plurality of second bosses located along the plurality of second crests and extending in a direction away from the plurality of first crests.

11. Filter media according characterization 10, wherein the filtration substrate comprises a plurality of creases wherein each crease separates alternating first and second pleat faces.

12. Filter media according characterization 11, wherein the plurality of first bosses are located in the first pleat faces and not in the second pleat faces, and the plurality of second bosses are located in the second pleat faces and not in the first pleat faces.

13. Filter media according to any one of characterizations 1-12, wherein the plurality of corrugations form a pattern of alternating first arcs and second arcs along the transverse direction, wherein the first arcs and the second arcs arc in opposite directions, and wherein the first crests are located at the peaks of the first arcs and the second crests are located at the peaks of the second arcs.

14. Filter media according characterization 13, wherein the plurality of corrugations are a asymmetric and the first arcs and the second arcs have different curvatures.

15. Filter media according characterization 13, wherein the plurality of corruptions are symmetric and the first arcs and the second arcs have curvatures that are similar.

16. Filter media according to characterization 13, wherein the first arcs and the second arcs have an amplitude of about 5 mils to about 1,500 mils.

17. Filter media according to any one of characterizations 1-16, wherein the plurality of bosses comprise conical sides and rounded tops.

18. Filter media according to any one of characterizations 1-17, wherein the plurality of bosses comprise a spherical shape.

19. Filter media according to any one of characterizations 1-18, wherein the plurality of bosses have base perimeter of about 10 mils to about 60 mils.

20. A filter media pack comprising:
(a) filter media provided in a pleated configuration comprising alternating first and second pleat tips and alternating first and second pleat faces, wherein:
  (i) the filter media includes a first edge and a second edge, and a width extending from the first edge to the second edge;
  (ii) the filter media includes a first end and a second end, and a length extending from the first end to the second end; and
  (iii) the alternating first and the second pleat tips and the alternating first and second pleat faces are located along the length of the filter media;
(b) the filter media comprises a plurality of corrugations arranged across the width of the media pack and extending along the length of the filter media, wherein:
  (i) the plurality of corrugations comprise alternating first arcs and second arcs;
  (ii) the first arcs and the second arcs arc in opposite directions;
  (iii) each of the first arcs comprise a first crest and each of the second arcs comprise a second crest; and
(c) the filter media comprises a plurality of bosses located along the first crest of the first arcs or along the second crest of the second arcs so that the bosses extend in direction away from the other of the first crest or the second crest.

21. A filter media pack according to characterization 20, wherein the plurality of bosses have a height sufficient to separate the alternating first and second pleat faces when provided in the pleated configuration.

22. A filter media pack according to any one of characterizations 20-21, wherein the media pack has a pleat density of about 6 pleats per inch to about 16 pleats per inch.

23. A filter media pack according to any one of characterizations 20-22, wherein the media pack has a pleat depth of at least about 0.375 inch, wherein the pleat depth is the longest distance from the first pleat tips to the second pleat tips.

24. Filter media pack according to any one of characterizations 20-23, wherein the plurality of bosses have a height of at least about 5 mils.

25. Filter media pack according to any one of characterizations 20-24, wherein the plurality of bosses have a height of about 5 mils to about 50 mils.

26. Filter media pack according to any one of characterizations 20-25, wherein the plurality of bosses comprise adjacent bosses spaced apart by a distance of at least 50 mils between bosses.

27. Filter media pack according to any one of characterizations 20-26, wherein the plurality of bosses comprise adjacent bosses spaced apart along a common crest by a distance of about 50 mils to about 1,500 mils.

28. Filter media pack according to any one of characterizations 20-27, wherein the plurality of bosses comprise a plurality of first bosses located along the plurality of first crests and extending in a direction away from the plurality of second crests, and a plurality of second bosses located along the plurality of second crests and extending in a direction away from the plurality of first crests.

29. Filter media pack according characterization 28, wherein the plurality of first bosses are located in the first pleat faces and not in the second pleat faces, and the plurality of second bosses are located in the second pleat faces and not in the first pleat faces.

30. Filter media pack according to any one of characterizations 20-29, wherein the plurality of corrugations are a asymmetric and the first arcs and the second arcs have different curvatures.

31. Filter media pack according to any one of characterizations 20-30, wherein the plurality of corruptions are symmetrical and the first arcs and the second arcs have curvatures that are similar.

32. Filter media pack according to any one of characterizations 20-31, wherein the first arcs and the second arcs have an amplitude of about 5 mils to about 1,500 mils.

33. Filter media according to any one of characterizations 20-32, wherein the plurality of bosses comprise conical sides and rounded tops.

34. Filter media pack according to any one of characterizations 20-33, wherein the plurality of bosses comprise a spherical shape.

35. Filter media according to any one of characterizations 20-34, wherein the plurality of bosses have base perimeter of about 10 mils to about 60 mils.

36. A method of forming a filter cartridge comprising:
(a) forming a filter media pack by folding a filter media according to any one of claims 1-35 to form alternating first pleat tips and second pleat tips; and
(b) providing a seal member to prevent fluid to be filtered from bypassing the filter media pack.

37. A method according to characterization 36, further comprising:
(a) forming the filter media pack into a panel media pack.

38. A method according to any one of characterizations 36-37, further comprising:
(a) forming the filter media pack into a cylindrical media pack.

39. A method according to any one of characterizations 36-38, further comprising:
(a) forming the filter media pack into a conical media pack.

The above specification provides a complete description of the manufacture and use of the composition of the invention. Since many embodiments of the invention can be made without departing from the spirit and scope of the invention, the invention resides in the claims hereinafter appended.

What is claimed is:

1. Filter media comprising:
(a) a filtration substrate having a first side and a second side, and constructed for filtering a fluid by flow of the fluid therethrough from the first side to the second side or from the second side to the first side;
(b) the filtration substrate has a first edge and a second edge, and a first end and a second end, wherein the filtration substrate has a machine direction extending from the first end to the second end, and a cross direction extending from the first edge to the second edge;
(c) the filtration substrate comprising a plurality of corrugations located in the cross direction and extending in the machine direction;
(d) the plurality of corrugations comprising a plurality of first crests formed along the first side of the filtration substrate and a plurality of second crests formed along the second side of the filtration substrate; and
(e) the filtration substrate comprises a plurality of permeable bosses located along the plurality of first crests or along the plurality of second crests and extending in a direction away from the other of the plurality of first crests or the plurality of second crests.

2. Filter media according to claim 1, wherein the filter media is arranged in a roll wound along the machine direction.

3. Filter media according to claim 2, wherein the filter media in a roll is arranged around a core and covered by a wrapper.

4. Filter media according to claim 1, wherein the filter media comprises cellulosic media and has a basis weight of about 48 lb/3,000 ft$^2$ to about 75 lb/3,000ft$^2$.

5. Filter media according to claim 1, wherein the plurality of bosses comprise a result of embossing the filtration substrate.

6. Filter media according to claim 1, wherein the plurality of bosses have a height of at least about 5 mils.

7. Filter media according to claim 1, wherein the plurality of bosses have a height of about 5 mils to about 50 mils.

8. Filter media according to claim 1, wherein the plurality of bosses comprise adjacent bosses spaced apart by a distance of at least 50 mils between bosses.

9. Filter media according to claim 1, wherein the plurality of bosses comprise adjacent bosses spaced apart along a common crest by a distance of about 50 mils to about 1,500 mils.

10. Filter media according to claim 1, wherein the plurality of bosses comprise a plurality of first bosses located along the plurality of first crests and extending in a direction away from the plurality of second crests, and a plurality of second bosses located along the plurality of second crests and extending in a direction away from the plurality of first crests.

11. Filter media according claim 10, wherein the filtration substrate comprises a plurality of creases wherein each crease separates alternating first and second pleat faces.

12. Filter media according claim 11, wherein the plurality of first bosses are located in the first pleat faces and not in the second pleat faces, and the plurality of second bosses are located in the second pleat faces and not in the first pleat faces.

13. Filter media according to claim 1, wherein the plurality of corrugations form a pattern of alternating first arcs and second arcs along the transverse direction, wherein the first arcs and the second arcs arc in opposite directions, and wherein the first crests are located at the peaks of the first arcs and the second crests are located at the peaks of the second arcs.

14. Filter media according claim 13, wherein the plurality of corrugations are a asymmetric and the first arcs and the second arcs have different curvatures.

15. Filter media according claim 13, wherein the plurality of corruptions are symmetric and the first arcs and the second arcs have curvatures that are similar.

16. Filter media according to claim 13, wherein the first arcs and the second arcs have an amplitude of about 5 mils to about 1,500 mils.

17. Filter media according to claim 1, wherein the plurality of bosses comprise conical sides and rounded tops.

18. Filter media according to claim 1, wherein the plurality of bosses comprise a spherical shape.

19. Filter media according to claim 1, wherein the plurality of bosses have base perimeter of about 10 mils to about 60 mils.

* * * * *